(12) United States Patent
Wada et al.

(10) Patent No.: US 10,757,281 B1
(45) Date of Patent: Aug. 25, 2020

(54) IMAGE READING APPARATUS FOR EXECUTING IMAGE PROCESSING BASED ON A RELIABILITY LEVEL ACCORDING TO A NUMBER OF CONVEYANCE MECHANISMS CLAMPING A MEDIUM

(71) Applicant: PFU LIMITED, Kahoku-shi, Ishikawa (JP)

(72) Inventors: Tomoaki Wada, Kahoku (JP); Koki Hamaya, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 16/510,718

(22) Filed: Jul. 12, 2019

(30) Foreign Application Priority Data

Mar. 20, 2019 (JP) .................................. 2019-053474

(51) Int. Cl.
*H04N 1/00* (2006.01)
*H04N 1/387* (2006.01)

(52) U.S. Cl.
CPC ..... *H04N 1/00748* (2013.01); *H04N 1/00718* (2013.01); *H04N 1/3878* (2013.01)

(58) Field of Classification Search
CPC .. H04N 1/3878; H04N 1/506; H04N 1/00588; H04N 1/00718; H04N 1/3876; H04N 2201/0081; H04N 2201/0082; H04N 1/00002; H04N 1/00005; H04N 1/00015; H04N 1/00029; H04N 1/00074; H04N 1/00082; H04N 1/00355; H04N 1/00432; H04N 1/00472; H04N 1/00474; H04N 1/00482; H04N 1/0062; H04N 1/00689; H04N 1/00694; H04N 1/00708;
(Continued)

(56) References Cited

U.S. PATENT DOCUMENTS 6,466,340 B1 * 10/2002 Washio ................ G06K 9/3283
358/488
6,693,721 B1 * 2/2004 Suzuki ................ G06K 15/00
358/1.13

(Continued)

FOREIGN PATENT DOCUMENTS

| JP | 2008-167093 A | 7/2008 |
|----|---------------|--------|
| JP | 2016-36065 A | 3/2016 |
| JP | 2017-225090 A | 12/2017 |

*Primary Examiner* — Negussie Worku
(74) *Attorney, Agent, or Firm* — Lewis Roca Rothgerber Christie LLP

(57) ABSTRACT

An image reading apparatus includes a plurality of conveyance mechanisms for clamping and conveying a medium, an imaging device for generating an input image in which a medium is imaged, a storage device for storing relative positions of the plurality of conveyance mechanisms with respect to an imaging position of the imaging device, and a processor for dividing the input image into a plurality of regions according to a number of conveyance mechanisms clamping a medium when each pixel in the input image is photographed, based on the relative positions, and setting a reliability level to each divided region in such a way that the reliability level increases as the number of conveyance mechanisms related to each region divided increases, and executing image processing on the input image based on at least a region the reliability level of which is greater than or equal to a threshold value.

10 Claims, 21 Drawing Sheets

(58) Field of Classification Search
CPC ........... H04N 1/00734; H04N 1/00737; H04N 1/00742; H04N 1/00745; H04N 1/00748; H04N 1/0075; H04N 1/00753; H04N 1/00755; H04N 1/00761; H04N 1/00774; H04N 1/00779; H04N 1/00795; H04N 1/00801; H04N 1/00814; H04N 1/00816; H04N 1/32358; H04N 1/387; H04N 1/3873; H04N 1/3877; H04N 1/40; H04N 1/40068; H04N 1/4092; H04N 1/60; H04N 2201/0005; H04N 2201/0094; H04N 2201/0098; H04N 2201/3242; H04N 2201/3274; B65H 2220/01; B65H 2220/03; B65H 2511/242; B65H 2511/51; B65H 2511/515; B65H 2511/52; B65H 1/04; B65H 2402/441; B65H 2553/412; B65H 2553/612; B65H 2553/81; B65H 2553/822; B65H 7/04; B65H 7/14; B65H 7/20; B65H 9/00; B41J 29/393; B41J 29/38; B41J 2/2142; B41J 2/473; G03G 15/55; G03G 2215/0161; G03G 15/0194; G03G 15/5058; G03G 2215/00067; G03G 2215/0119; G03G 2215/0129; G03G 2215/0158; G03G 2215/017; G06K 2209/01; G06K 9/00442; G06K 9/036; G06K 9/3233; G06K 9/3275; G06K 9/3283; G06K 9/4604; G06K 9/4638; G06K 9/00; G06K 9/00288; G06K 9/00449; G06K 9/00463; G06K 9/62; G06K 9/627; G06T 7/12; G06T 1/00; G06T 2207/10008; G06T 2207/30176; G06T 7/00; G06T 7/10; G06T 7/181; G06T 7/70; A61B 5/163; A61B 5/165; A61B 5/4803; A61B 5/7221; A61B 5/7267; G02B 26/123; G06N 7/005
USPC .................................................. 358/488, 448
See application file for complete search history.

(56) References Cited

U.S. PATENT DOCUMENTS

| | | | | |
|---|---|---|---|---|
| 8,477,390 | B2* | 7/2013 | Iwayama | H04N 1/3878 |
| | | | | 358/1.12 |
| 9,030,720 | B2* | 5/2015 | Omoya | B65H 7/14 |
| | | | | 358/486 |
| 9,100,608 | B2* | 8/2015 | Yamada | H04N 1/3878 |
| 9,266,346 | B2* | 2/2016 | Yasukawa | B41J 2/21 |
| 9,492,998 | B2* | 11/2016 | Nakajima | B41J 2/2132 |
| 9,807,277 | B2* | 10/2017 | Nomura | H04N 1/3878 |
| 9,832,343 | B2* | 11/2017 | Shimahashi | H04N 1/60 |
| 9,848,104 | B1* | 12/2017 | Wada | G06T 3/608 |
| 10,110,776 | B2* | 10/2018 | Sunada | H04N 1/00588 |
| 10,402,961 | B2* | 9/2019 | Fukase | G06T 7/11 |
| 10,523,837 | B1* | 12/2019 | Wada | H04N 1/00718 |
| 2009/0322824 | A1* | 12/2009 | Hori | B41J 2/16585 |
| | | | | 347/30 |
| 2016/0037008 | A1 | 2/2016 | Mori | |
| 2017/0087874 | A1* | 3/2017 | Maida | B41J 2/01 |
| 2017/0270642 | A1* | 9/2017 | Wada | G06T 5/002 |
| 2017/0366705 | A1 | 12/2017 | Wada | |
| 2018/0176408 | A1* | 6/2018 | Wada | G06T 3/403 |
| 2018/0343361 | A1* | 11/2018 | Okada | H04N 1/00718 |
| 2019/0287267 | A1* | 9/2019 | Chen | G06T 7/80 |
| 2020/0167588 | A1* | 5/2020 | Ohara | G06K 9/4652 |

\* cited by examiner

| PART | RELATIVE POSITION |
|---|---|
| FEED ROLLERS AND BRAKE ROLLERS | POSITION ON UPSTREAM SIDE BY D1 |
| FIRST CONVEYANCE ROLLERS AND SECOND CONVEYANCE ROLLERS | POSITION ON UPSTREAM SIDE BY D2 |
| SECOND MEDIUM SENSOR | POSITION ON UPSTREAM SIDE BY D3 |
| THIRD CONVEYANCE ROLLERS AND FOURTH CONVEYANCE ROLLERS | POSITION ON DOWNSTREAM SIDE BY D4 |
| ... | ... |

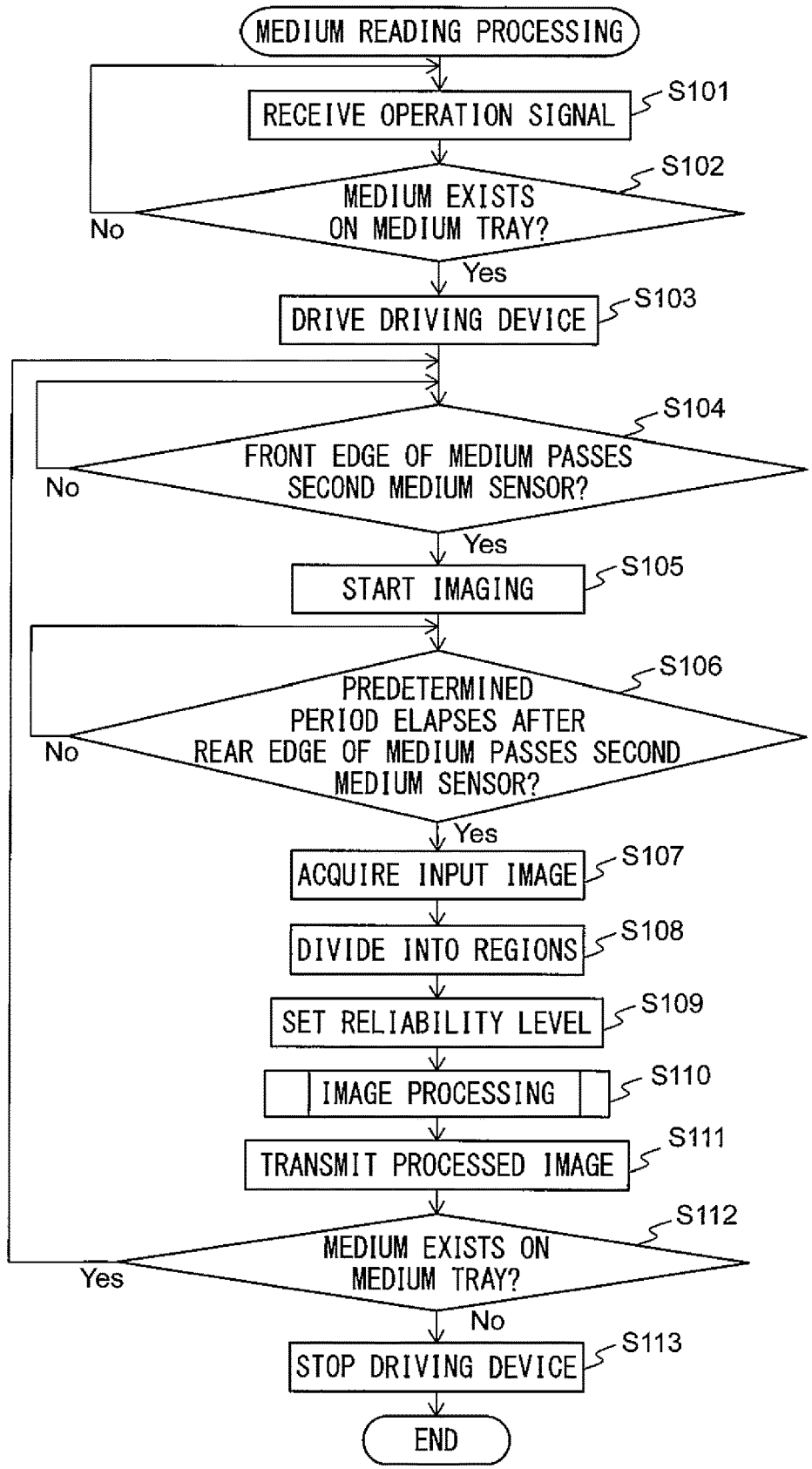

IMAGE READING APPARATUS FOR EXECUTING IMAGE PROCESSING BASED ON A RELIABILITY LEVEL ACCORDING TO A NUMBER OF CONVEYANCE MECHANISMS CLAMPING A MEDIUM

CROSS-REFERENCE TO RELATED APPLICATIONS

This application is based upon and claims the benefit of priority of prior Japanese Patent Application No. 2019-053474, filed on Mar. 20, 2019, the entire contents of which are incorporated herein by reference.

TECHNICAL FIELD

Embodiments discussed in the present specification relate to image processing.

BACKGROUND

When conveying and reading a medium in an image reading apparatus such as a scanner, a skew (oblique movement), that is, a medium being conveyed in a tilted manner, may occur and a medium region in an input image in which the medium is imaged may tilt. Such an image reading apparatus needs to execute image processing such as tilt correction processing of a medium region and cropping processing of a medium on an input image in which the medium is imaged in a tilted manner.

An image reading apparatus correcting a tilt of image data read from a regular document, based on a comparison result between read image data of a reference document an image of which is read while being conveyed with previously stored reference image data of the reference document, is disclosed (see Japanese Unexamined Patent Publication (Kokai) No. 2008-167093).

SUMMARY

It is desired that an image reading apparatus more suitably execute image processing on an input image.

It is an object of an image reading apparatus, an image processing system, a control method, and a computer-readable, non-transitory medium storing a control program to more suitably execute image processing on an input image.

According to an aspect of the apparatus, there is provided an image reading apparatus. The image reading apparatus includes a plurality of conveyance mechanisms for clamping and conveying a medium, an imaging device for generating an input image in which a medium is imaged, a storage device for storing relative positions of the plurality of conveyance mechanisms with respect to an imaging position of the imaging device, and a processor for dividing the input image into a plurality of regions according to a number of conveyance mechanisms clamping a medium when each pixel in the input image is photographed, based on the relative positions, and setting a reliability level to each divided region in such a way that the reliability level increases as the number of conveyance mechanisms related to each divided region increases, and executing image processing on the input image based on at least a region in the input image the reliability level of which is greater than or equal to a threshold value.

According to an aspect of the apparatus, there is provided an image reading apparatus. The image reading apparatus includes a plurality of conveyance mechanisms for clamping and conveying a medium, an imaging device for generating an input image in which a medium is imaged, and a processor for executing image processing on the input image based on at least a region a reliability level of which is greater than or equal to a threshold value, the reliability level indicating a larger value as a number of conveyance mechanisms increases, out of a plurality of regions in the input image divided, according to the number of conveyance mechanisms clamping a medium when each pixel in the input image is photographed, based on relative positions of the plurality of conveyance mechanisms with respect to an imaging position of the imaging device.

According to an aspect of the system, there is provided an image processing system including an image reading apparatus and an information processing apparatus. The image reading apparatus includes a plurality of conveyance mechanisms for clamping and conveying a medium, and an imaging device for generating an input image in which a medium is imaged. The information processing apparatus includes a processor for executing image processing on the input image based on at least a region a reliability level of which is greater than or equal to a threshold value, the reliability level indicating a larger value as a number of conveyance mechanisms increases, out of a plurality of regions in the input image divided, according to the number of conveyance mechanisms clamping a medium when each pixel in the input image is photographed, based on relative positions of the plurality of conveyance mechanisms with respect to an imaging position of the imaging device.

According to an aspect of the method, there is provided a control method for an image reading apparatus including a plurality of conveyance mechanisms for clamping and conveying a medium, and an imaging device for generating an input image in which a medium is imaged. The method includes executing image processing on the input image based on at least a region a reliability level of which is greater than or equal to a threshold value, the reliability level indicating a larger value as a number of conveyance mechanisms increases, out of a plurality of regions in the input image divided, according to the number of conveyance mechanisms clamping a medium when each pixel in the input image is photographed, based on relative positions of the plurality of conveyance mechanisms with respect to an imaging position of the imaging device.

According to an aspect of the computer-readable, non-transitory medium storing a computer program, the computer program causes an image reading apparatus including a plurality of conveyance mechanisms for clamping and conveying a medium, and an imaging device for generating an input image in which a medium is imaged, to execute a process. The process includes executing image processing on the input image based on at least a region a reliability level of which is greater than or equal to a threshold value, the reliability level indicating a larger value as a number of conveyance mechanisms increases, out of a plurality of regions in the input image divided, according to the number of conveyance mechanisms clamping a medium when each pixel in the input image is photographed, based on relative positions of the plurality of conveyance mechanisms with respect to an imaging position of the imaging device.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF DRAWINGS

FIG. 7 is a flowchart illustrating an operation example of medium reading processing.

DESCRIPTION OF EMBODIMENTS

Hereinafter, an image reading apparatus, an image processing system, a control method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
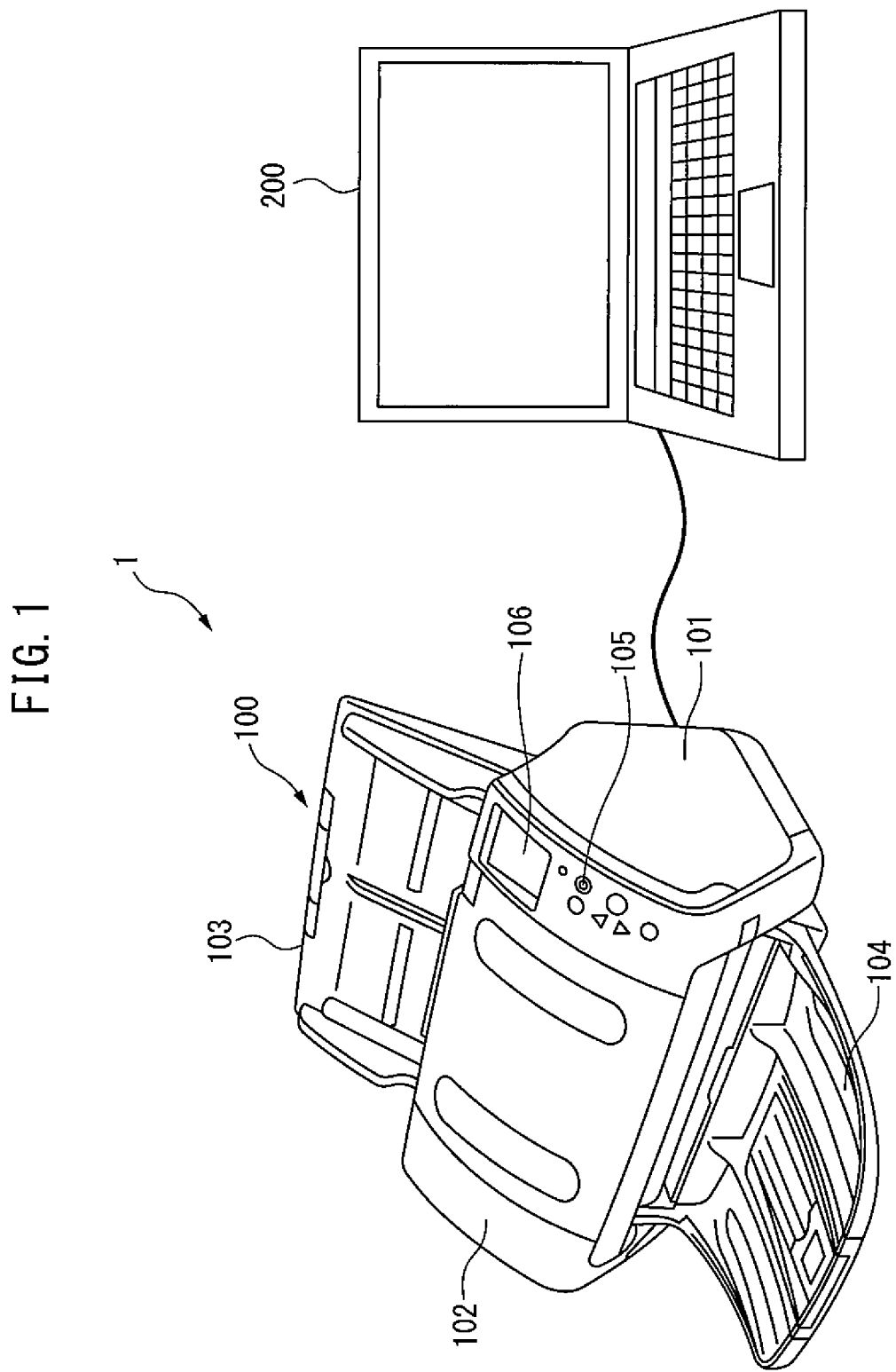
FIG. 1 is a configuration diagram of an example of an image processing system 1 according to an embodiment.

FIG. 1 is a configuration diagram of an example of an image processing system 1 according to an embodiment.

The image processing system 1 includes an image reading apparatus 100 and an information processing apparatus 200. The image reading apparatus 100 is an image scanner, etc. The image reading apparatus 100 conveys and images a medium being a document. A medium is paper, thick paper, a card, a brochure, a passport, etc. The image reading apparatus 100 may be a fax machine, a copying machine, a multifunctional peripheral (MFP), etc. A conveyed medium may not be a document but may be an object being printed on etc., and the image reading apparatus 100 may be a printer etc. The information processing apparatus 200 is a personal computer, a multifunctional mobile terminal, or a mobile phone, etc. The image reading apparatus 100 and the information processing apparatus 200 are mutually connected.

The image reading apparatus 100 includes a lower housing 101, an upper housing 102, a medium tray 103, an ejection tray 104, a first operation device 105, and a first display device 106.

The upper housing 102 is arranged in a position covering a top surface of the image reading apparatus 100, and is engaged with the lower housing 101 by a hinge in such a way as to be able to open and close in a case of a medium being stuck, cleaning inside the image reading apparatus 100, etc. The medium tray 103 is engaged with the lower housing 101 in such a way as to be able to place a medium to be conveyed. The ejection tray 104 is engaged with the lower housing 101 in such a way as to be able to hold an ejected medium.

The first operation device 105 includes an input device such as a button, and an interface circuit acquiring a signal from the input device, receives an input operation by a user, and outputs an operation signal based on the input operation by the user. The first display device 106 includes a display including a liquid crystal or organic electro-luminescence (EL), and an interface circuit for outputting image data to the display, and displays the image data on the display.

Figure 2:
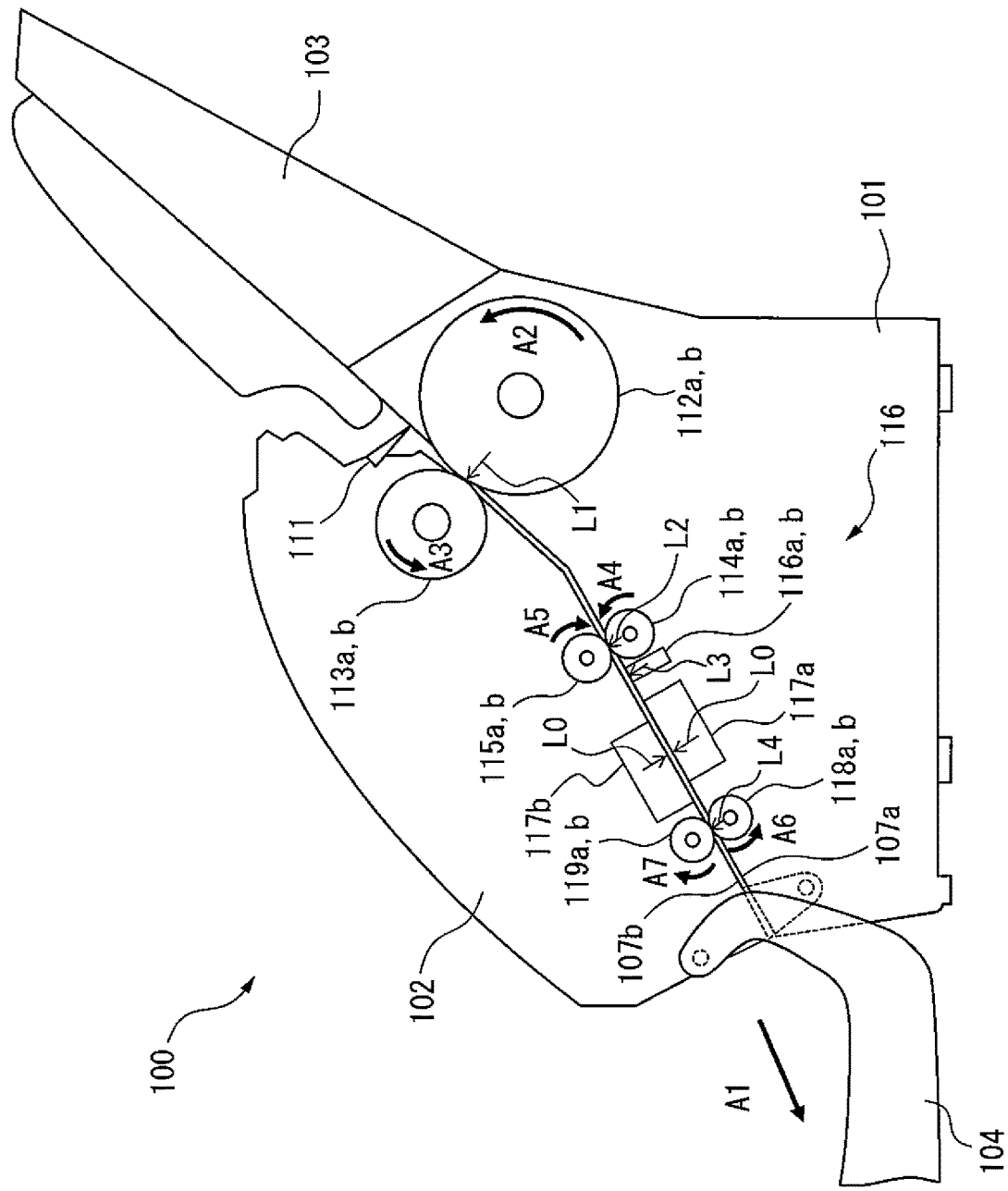
FIG. 2 is a diagram for illustrating a conveyance path inside an image reading apparatus 100.

FIG. 2 is a diagram for illustrating a conveyance path inside the image reading apparatus 100.

The conveyance path inside the image reading apparatus 100 includes a first medium sensor 111, a plurality of feed rollers 112a and 112b, a plurality of brake rollers 113a and 113b, a plurality of first conveyance rollers 114a and 114b, a plurality of second conveyance rollers 115a and 115b, a second medium sensor 116, a first imaging device 117a, a second imaging device 117b, a plurality of third conveyance rollers 118a and 118b, and a plurality of fourth conveyance rollers 119a and 119b, etc.

The feed rollers 112a and 112b may be hereinafter collectively referred to as feed rollers 112. Further, the brake rollers 113a and 113b may be collectively referred to as brake rollers 113. Further, the first conveyance rollers 114a and 114b may be collectively referred to as first conveyance rollers 114. Further, the second conveyance rollers 115a and 115b may be collectively referred to as second conveyance rollers 115. Further, the first imaging device 117a and the second imaging device 117b may be collectively referred to as imaging devices 117. Further, the third conveyance rollers 118a and 118b may be collectively referred to as third conveyance rollers 118. Further, the fourth conveyance rollers 119a and 119b may be collectively referred to as fourth conveyance rollers 119.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first medium sensor 111 is arranged on the upstream side of the feed rollers 112 and the brake rollers 113. The first medium sensor 111 includes a contact detection sensor and detects whether or not a medium is placed on the medium tray 103. The first medium sensor 111 generates and outputs a first detection signal changing the signal value between a state in which a medium is placed on the medium tray 103 and a state in which a medium is not placed.

The feed rollers 112 are provided on the lower housing 101 and sequentially feed media placed on the medium tray 103 from the lower side. The brake rollers 113 are provided on the upper housing 102 and are arranged to face the feed rollers 112. The feed rollers 112 and the brake rollers 113 are examples of a conveyance mechanism, and clamp a medium at a nip position L1 of the rollers and convey the medium toward the downstream side.

The first conveyance rollers 114 and the second conveyance rollers 115 are arranged to face one another on the downstream side of the feed rollers 112 and the brake rollers 113. The first conveyance rollers 114 and the second conveyance rollers 115 are examples of a conveyance mechanism, and clamp a medium fed by the feed rollers 112 and the brake rollers 113 at a nip position L2 of the rollers and convey the medium toward the downstream side.

The second medium sensor 116 is arranged on the downstream side of the first conveyance rollers 114 and the second conveyance rollers 115, and also on the upstream side of the imaging devices 117. The second medium sensor 116 includes a light emitter 116a and a light receiver 116b provided on the lower housing 101 and a reflection member (unillustrated), such as a mirror, being provided on the upper housing 102 and being arranged to face the light emitter 116a and the light receiver 116b. The light emitter 116a projects light toward the medium conveyance path. On the other hand, the light receiver 116b receives light projected by the light emitter 116a and reflected by the first center reflection member, and generates and outputs a first center signal being an electric signal based on intensity of the received light. When a medium exists at a position of the second medium sensor 116, light projected by the light emitter 116a is shaded by the medium. Accordingly, a signal value of the second detection signal varies between a state in which a medium exists at a position of the second medium sensor 116 and a state in which a medium does not exist. Consequently, the second medium sensor 116 detects whether or not a medium exists at the arrangement position L3. The light emitter 116a and the light receiver 116b may be provided in positions facing one another with the conveyance path in between, and the reflection member may be omitted.

The first imaging device 117a is an example of an imaging module and includes a reduction optical system type line sensor including an imaging element based on charge coupled devices (CCDs) linearly arranged in a main scanning direction. Further, the first imaging device 117a includes a lens for forming an image on the imaging element, and an A/D converter for amplifying and analog-digital (A/D) converting an electric signal output from the imaging element. The first imaging device 117a generates and outputs an input image in which the back side of a conveyed medium is imaged at an imaging position L0, in accordance with control from a CPU to be described later.

Similarly, the second imaging device 117b is an example of an imaging module and includes a reduction optical system type line sensor including an imaging element based on charge coupled devices (CCDs) linearly arranged in a main scanning direction. Further, the second imaging device 117b includes a lens for forming an image on the imaging element, and an A/D converter for amplifying and analog-digital (A/D) converting an electric signal output from the imaging element. The second imaging device 117b generates and outputs an input image in which the front side of a conveyed medium is imaged at an imaging position L0, in accordance with control from a CPU to be described later.

Only either of the first imaging device 117a and the second imaging device 117b may be arranged in the image reading apparatus 100 and only one side of a medium may be read. Further, a unity-magnification optical system type contact image sensor (CIS) including an imaging element based on a complementary metal oxide semiconductor (CMOS) may be used in place of the imaging element based on CCDs.

The third conveyance rollers 118 and the fourth conveyance rollers 119 are arranged to face one another on the downstream side of the imaging devices 117. The third conveyance rollers 118 and the fourth conveyance rollers 119 are examples of a conveyance mechanism, and clamp a medium conveyed by the first conveyance rollers 114 and the second conveyance rollers 115 at a nip position L4 of the rollers and convey the medium toward the downstream side.

A medium placed on the medium tray 103 is conveyed between the lower guide 107a and the upper guide 107b in the medium conveying direction A1 by the feed rollers 112 rotating in a direction of an arrow A2 in FIG. 2, that is, a medium feeding direction. When a medium is conveyed, the brake rollers 113 rotate in a direction of an arrow A3, that is, a direction opposite to the medium feeding direction. By the workings of the feed rollers 112 and the brake rollers 113, when a plurality of media are placed on the medium tray 103, only a medium in contact with the feed rollers 112, out of the media placed on the medium tray 103, is separated. Consequently, the image reading apparatus 100 operates in such a way that conveyance of a medium other than the separated medium is restricted (prevention of multi-feed).

A medium is fed between the first conveyance rollers 114 and the second conveyance rollers 115 while being guided by the lower guide 107a and the upper guide 107b. The medium is fed between the first imaging device 117a and the second imaging device 117b by the first conveyance rollers 114 and the second conveyance rollers 115 rotating in directions of an arrow A4 and an arrow A5, respectively. The medium read by the imaging devices 117 is ejected on the ejection tray 104 by the third conveyance rollers 118 and the fourth conveyance rollers 119 rotating in directions of an arrow A6 and an arrow A7, respectively.

Figure 3:
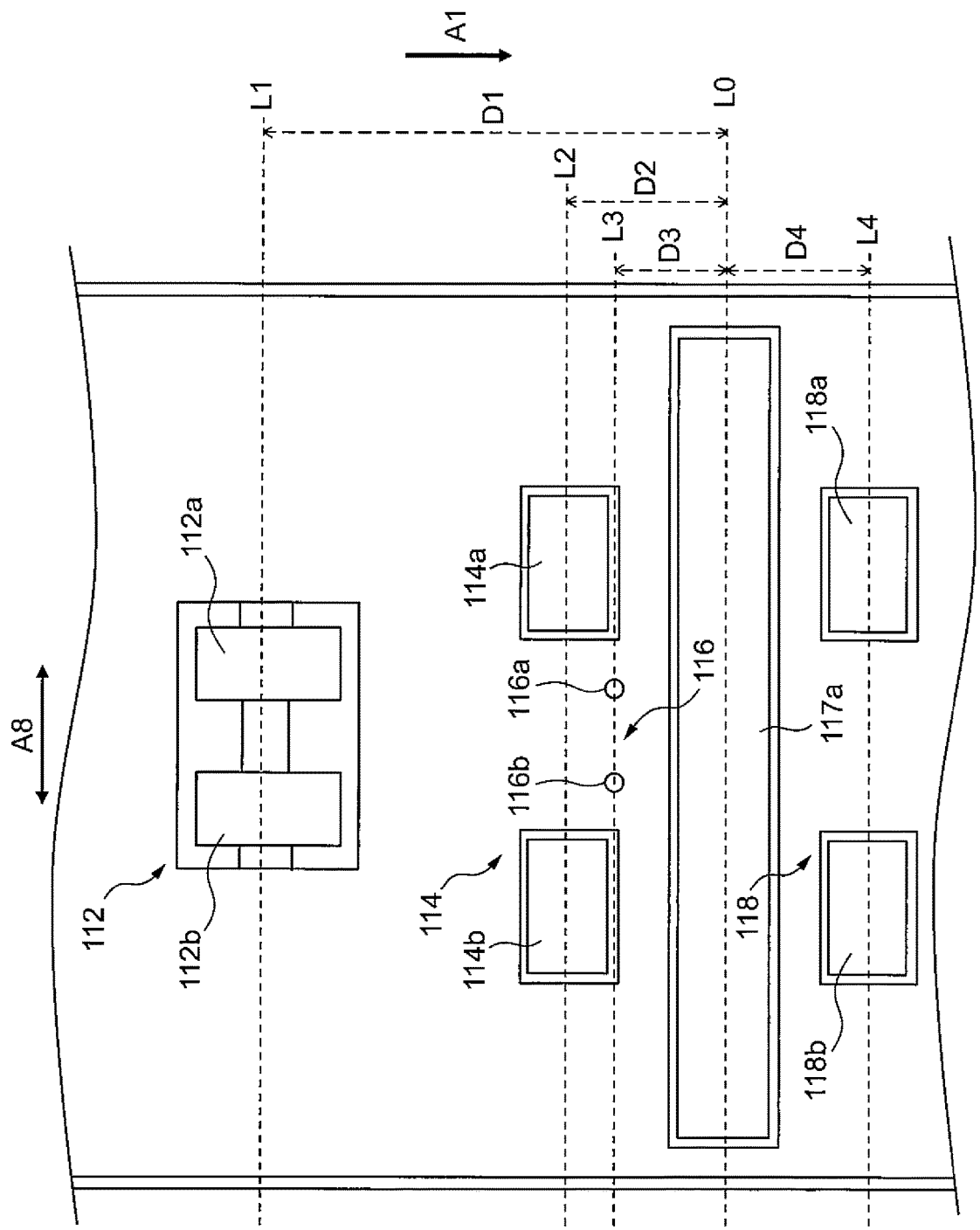
FIG. 3 is a schematic diagram for illustrating an arrangement of feed rollers 112, etc.

FIG. 3 is a schematic diagram for illustrating an arrangement of the feed rollers 112, the first conveyance rollers 114, the second medium sensor 116, the imaging devices 117, and the third conveyance rollers 118. FIG. 3 is a schematic diagram of the lower housing 101 viewed from above in a state in which the upper housing 102 is removed.

As illustrated in FIG. 3, the nip position L1 of the feed rollers 112 and the brake rollers 113 is positioned on the upstream side of the imaging position L0 of the imaging devices 117 by a distance D1. The nip position L2 of the first conveyance rollers 114 and the second conveyance rollers 115 is positioned on the upstream side of the imaging position L0 of the imaging devices 117 by a distance D2 less than the distance D1. The arrangement position L3 of the second medium sensor 116 is positioned on the upstream side of the imaging position L0 of the imaging devices 117 by a distance D3 less than the distance D2. The nip position L4 of the third conveyance rollers 118 and the fourth conveyance rollers 119 is positioned on the downstream side of the imaging position L0 of the imaging devices 117 by a distance D4.

Figure 4:
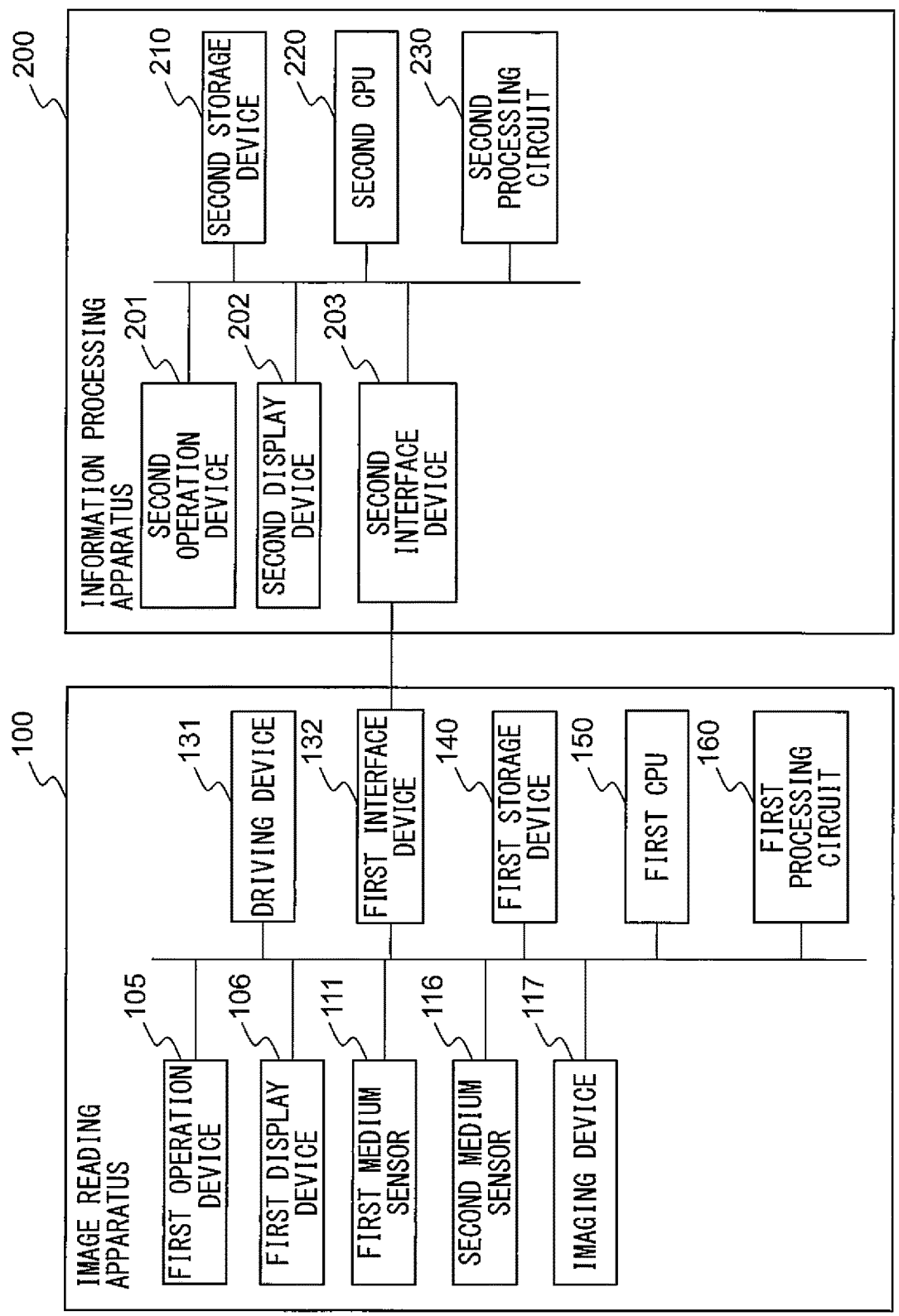
FIG. 4 is a block diagram illustrating schematic configurations of the image reading apparatus 100, etc.

FIG. 4 is a block diagram illustrating a schematic configuration of the image reading apparatus 100 and the information processing apparatus 200.

The image reading apparatus 100 further includes a driving device 131, a first interface device 132, a first storage device 140, a first central processing unit (CPU) 150, and a first processing circuit 160, etc., in addition to the configuration described above.

The driving device 131 includes one or a plurality of motors, and conveys a medium by rotating the feed rollers 112, the brake rollers 113, and the first to fourth conveyance rollers 114, 115, 118, and 119, by a control signal from the CPU 150.

For example, the interface device 132 includes an interface circuit conforming to a serial bus such as universal serial bus (USB), transmits and receives various types of images and information through a communication connection with the information processing apparatus 200. Further, a communication module including an antenna transmitting and receiving wireless signals, and a wireless communication interface device for transmitting and receiving signals through a wireless communication line in conformance with a predetermined communication protocol may be used in place of the interface device 132. For example, the predetermined communication protocol is a wireless local area network (LAN).

The first storage device 140 includes a memory device such as a random access memory (RAM) or a read only memory (ROM), a fixed disk device such as a hard disk, or a portable storage device such as a flexible disk or an optical disk. Further, the first storage device 140 stores a computer program, a database, a table, etc., used for various types of processing in the image reading apparatus 100. The computer program may be installed on the first storage device 140 from a computer-readable, non-transitory medium such as a compact disk read only memory (CD-ROM), a digital versatile disk read only memory (DVD-ROM), etc., by using a well-known setup program, etc.

Further, the first storage device 140 stores, as data, a position table indicating a relative position of each part with respect to the imaging position L0 of the imaging devices 117. Details of the position table will be described later. The first storage device 140 is an example of a storage device.

The first CPU 150 operates in accordance with a program previously stored in the first storage device 140. A digital signal processor (DSP), a large scale integration (LSI), etc., may be used in place of the CPU 160. Further, an application specific integrated circuit (ASIC), a field-programmable gate array (FPGA), etc., may be used in place of the first CPU 160.

The first CPU 150 is connected to the first operation device 105, the first display device 106, the first medium sensor 111, the second medium sensor 116, the imaging devices 117, the driving device 131, the first interface device 132, the first storage device 140, the first processing circuit 160, etc., and controls each of these units. The first CPU 150 performs drive control of the driving device 131, medium reading control of the imaging devices 117, etc., acquires an input image, and executes predetermined image processing on the acquired input image.

The first processing circuit 160 executes predetermined image processing such as correction processing on an image imaged by the imaging device 117. A DSP, an LSI, an ASIC, an FPGA, etc., may be used in place of the processing circuit 160.

Whereas, the information processing apparatus 200 further includes a second operation device 201, a second display device 202, a second interface device 203, a second storage device 210, a second CPU 220, a second processing circuit 230, etc.

The operation second device 201 includes an input device and an interface circuit that acquires signals from the input device, receives an operation by a user, and outputs signals according to the input by the user to the second CPU 220.

The second display device 202 includes a display composed of liquid crystal, organic EL, etc., and an interface circuit for outputting image data on the display and displays image data on the display according to an instruction from the second CPU 220.

The second interface device 203 includes an interface circuit or a wireless communication interface circuit, similar to the one of the first interface device 132, and transmits and receives a variety of images and information through a communication connection with the image reading apparatus 100.

The second storage device 210 has: a memory device, such as a RAM and a ROM; a fixed disk device, such as a hard disk; or a portable storage device, such as a flexible disk and an optical disk. Further, the second storage device 210 stores a computer program, a database, a table, etc., that are used for various processing of the information processing apparatus 200. The computer program may be installed on the second storage device 210 from a computer-readable, non-transitory medium such as a CD-ROM, a DVD-ROM, etc., by using a well-known setup program, etc.

The second CPU 220 operates according to a program stored in advance in the second storage device 210. Note that a DSP, a LSI, an ASIC, a FPGA, etc., may be used instead of the second CPU 220.

The second CPU 220 is connected to the second operation device 201, the second display device 202, the second interface device 203, the second storage device 210, the second processing circuit 230, etc., and controls these components. The second CPU 220 controls the components and executes image processing on images acquired from the image reading apparatus 100.

The second processing circuit 230 performs predetermined image processing such as correction processing on an image acquired from the image reading apparatus 100. Note that a DSP, a LSI, an ASIC, a FPGA, etc., may be used as the second processing circuit 230.

Figures 5, 6:
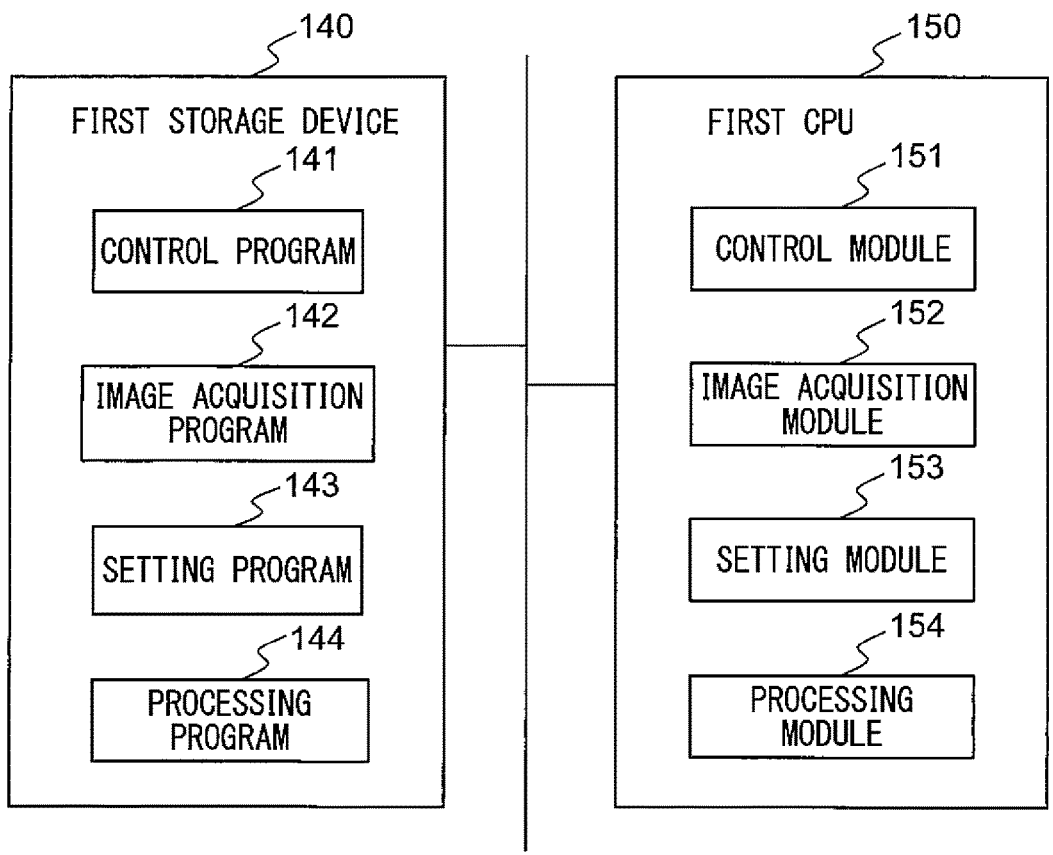
FIG. 5 is a diagram illustrating an example of a data structure of a position table.
FIG. 6 is a diagram illustrating schematic configurations of a first storage device 140 and a first CPU 150.

FIG. 5 is a diagram illustrating an example of a data structure of the position table.

As illustrated in FIG. 5, the position table stores a relative position of each part with respect to the imaging position L0 of the imaging devices 117, for specific parts included in the image reading apparatus 100. The parts relative positions of which are stored include a roller pair of the feed rollers 112 and the brake rollers 113, a roller pair of the first conveyance rollers 114 and the second conveyance rollers 115, the second medium sensor 116, and a roller pair of the third conveyance rollers 118 and the fourth conveyance rollers 119. For example, a central position in a nip of each roller pair is used as a position of each roller pair. A position closest to the imaging position L0 or a position most distant from the imaging position L0 in a nip of each roller pair may be used as a position of each roller pair. Further, a position adjusted for an individual difference measured in a manufacturing test, etc., for each device may be stored as a relative position of each part. Further, a relative position of each part may be stored in a register, etc., rather than the first storage device 140.

FIG. 6 is a diagram illustrating schematic configurations of the first storage device 140 and the first CPU 150.

As illustrated in FIG. 6, the first storage device 140 stores a control program 141, an image acquisition program 142, a setting program 143, a processing program 144, etc. Each of these programs is a functional module implemented by software operating on a processor. The first CPU 150 reads each program stored in the first storage device 140 and operates in accordance with each read program. Consequently, the first CPU 150 functions as a control module 151, an image acquisition module 152, a setting module 153, and a processing module 154.

FIG. 7 is a flowchart illustrating an operation example of medium reading processing in the image reading apparatus 100.

Referring to the flowchart illustrated in FIG. 7, an operation example of the medium reading processing in the image reading apparatus 100 will be described below. The operation flow described below is executed mainly by the first CPU 150 in cooperation with each element in the image reading apparatus 100, in accordance with a program previously stored in the first storage device 140. The operation flow illustrated in FIG. 7 is periodically executed.

First, the control module 151 stands by until an instruction to read a medium is input by a user by use of the first operation device 105, and an operation signal instructing to read the medium is received from the first operation device 105 (step S101).

Next, the control module 151 acquires a first detection signal from the first medium sensor 111 and determines whether or not a medium is placed on the medium tray 103, based on the acquired first detection signal (step S102).

When a medium is not placed on the medium tray 103, the control module 151 returns the processing to step S101 and stands by until newly receiving an operation signal from the first operation device 105.

On the other hand, when a medium is placed on the medium tray 103, the control module 151 drives the driving device 131, rotates the feed rollers 112, the brake rollers 113, and the first to fourth conveyance rollers 114, 115, 118, and 119, and feeds and conveys the medium (step S103).

Next, the image acquisition module 152 determines whether or not the front edge of the medium passes a position of the second medium sensor 116 (step S104). The image acquisition module 152 periodically acquires a second detection signal from the second medium sensor 116 and based on the acquired second detection signal, determines whether or not the medium exists at the position of the second medium sensor 116. The image acquisition module 152 determines that the front edge of the medium passes the position of the second medium sensor 116 when a signal value of the second detection signal changes from a value indicating nonexistence of a medium to a value indicating existence of a medium. The image acquisition module 152 stands by until the front edge of the medium passes the position of the second medium sensor 116.

When the front edge of the medium passes the position of the second medium sensor 116, the image acquisition module 152 causes the imaging devices 117 to start imaging of the medium (step S105).

Next, the image acquisition module 152 determines whether or not a predetermined period elapses after the rear edge of the medium passes the position of the second medium sensor 116 (step S106). The image acquisition module 152 determines that the rear edge of the medium passes the position of the second medium sensor 116 when the signal value of the second detection signal acquired from the second medium sensor 116 changes from the value indicating existence of a medium to the value indicating nonexistence of a medium. The predetermined period is set to a period acquired by adding a margin to a medium conveyance time from the position of the second medium sensor 116 to a position of the imaging devices 117. For example, the predetermined period is set to a period being twice the medium conveyance time from the position of the second medium sensor 116 to the position of the imaging devices 117.

When the predetermined period elapses after the rear edge of the medium passes the position of the second medium sensor 116, the image acquisition module 152 causes the imaging devices 117 to end the imaging of the medium and acquires an input image (step S107).

Next, the setting module 153 divides the input image into a plurality of regions according to a number of conveyance mechanisms clamping the medium when each pixel in the input image is photographed, based on the relative positions stored in the position table (step S108).

FIG. 8A to FIG. 8E are schematic diagrams for illustrating a positional relation between the imaging devices 117 and a medium M imaged by the imaging devices 117.

Figure 8A:
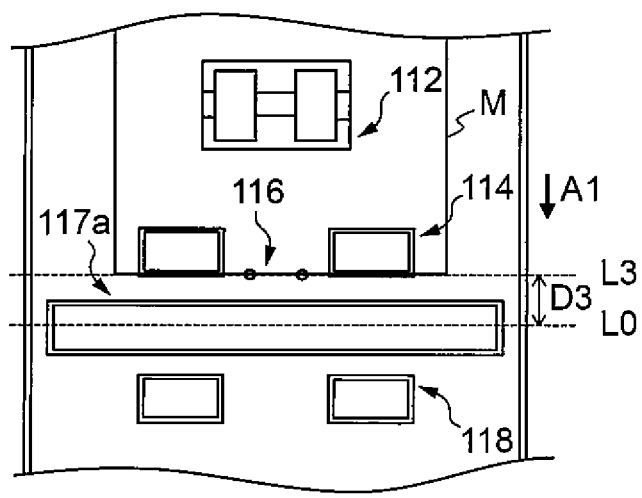
FIG. 8A is a schematic diagram for illustrating a positional relation between an imaging device 117 and a medium.

FIG. 8A illustrates a state in which the front edge of the medium M reaches the arrangement position L3 of the second medium sensor 116. At this time, the medium M is clamped by two groups of conveyance mechanisms being the feed rollers 112 and the brake rollers 113, and the first conveyance rollers 114 and the second conveyance rollers 115.

Figure 8B:
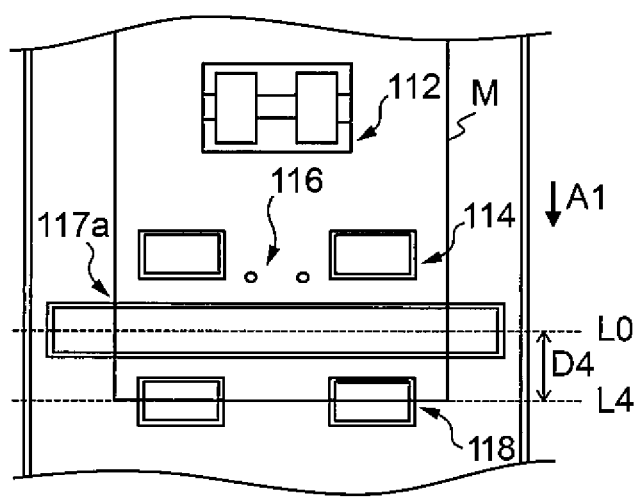
FIG. 8B is a schematic diagram for illustrating the positional relation between the imaging device 117 and a medium.

FIG. 8B illustrates a state in which the front edge of the medium M reaches the nip position L4 of the third conveyance rollers 118 and the fourth conveyance rollers 119. From here on, the medium M is clamped by three groups of conveyance mechanisms being the feed rollers 112 and the brake rollers 113, the first conveyance rollers 114 and the second conveyance rollers 115, and the third conveyance rollers 118 and the fourth conveyance rollers 119. While making a transition from the state in FIG. 8A to the state in FIG. 8B, the medium M is conveyed by the total of the distance D3 between the arrangement position L3 of the second medium sensor 116 and the imaging position L0, and the distance D4 between the imaging position L0 and the nip position L4 of the third conveyance rollers 118 and the fourth conveyance rollers 119.

Figure 8C:
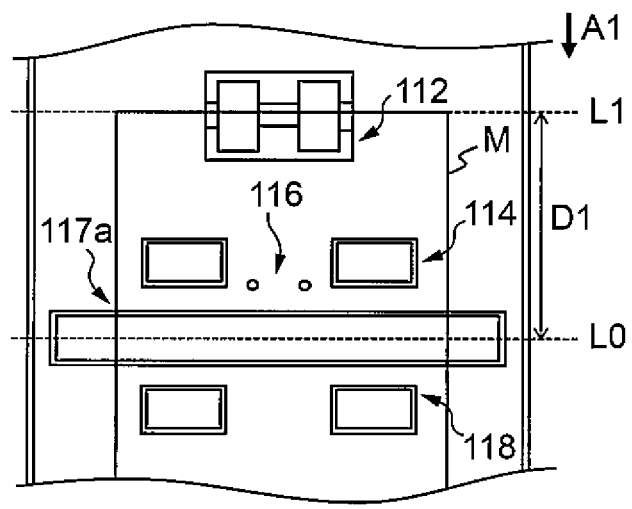
FIG. 8C is a schematic diagram for illustrating the positional relation between the imaging device 117 and a medium.

FIG. 8C illustrates a state in which the rear edge of the medium M reaches the nip position L1 of the feed rollers 112 and the brake rollers 113. From here on, the medium M is clamped by two groups of conveyance mechanisms being the first conveyance rollers 114 and the second conveyance rollers 115, and the third conveyance rollers 118 and the fourth conveyance rollers 119.

Figure 8D:
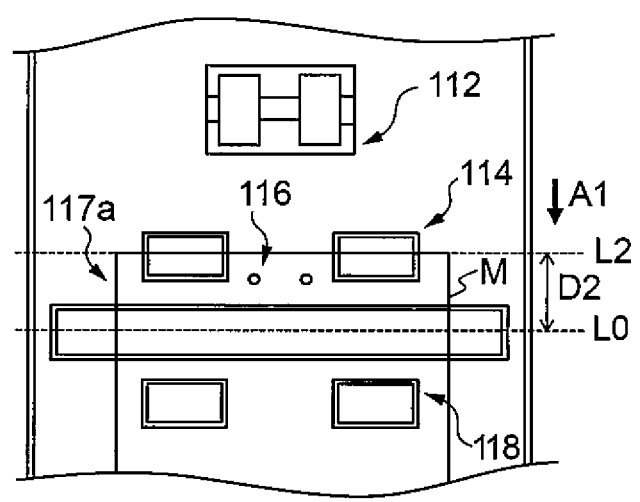
FIG. 8D is a schematic diagram for illustrating the positional relation between the imaging device 117 and a medium.

FIG. 8D illustrates a state in which the rear edge of the medium M reaches the nip position L2 of the first conveyance rollers 114 and the second conveyance rollers 115. From here on, the medium M is clamped only by one group of conveyance mechanisms being the third conveyance rollers 118 and the fourth conveyance rollers 119.

Figure 8E:
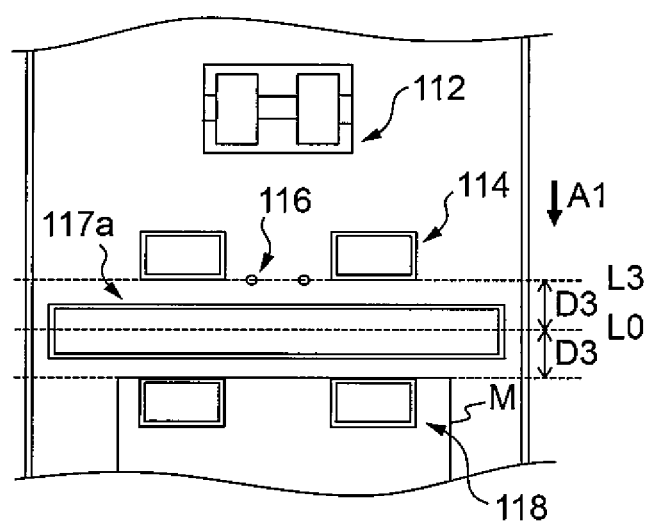
FIG. 8E is a schematic diagram for illustrating the positional relation between the imaging device 117 and a medium.

FIG. 8E illustrates a state in which a predetermined period elapses after the rear edge of the medium M passes the arrangement position L3 of the second medium sensor 116. When the predetermined period is set to a period being twice the medium conveyance time from the position of the second medium sensor 116 to the position of the imaging devices 117, a distance between the imaging position L0 and a position of the rear edge of the medium M at this time is the distance D3. Accordingly, while making a transition from the state in FIG. 8C to the state in FIG. 8E, the medium M is conveyed by the total of the distance D1 between the nip position L1 of the feed rollers 112 and the brake rollers 113, and the imaging position L0, and the distance D3. Further, while making a transition from the state in FIG. 8D to the state in FIG. 8E, the medium M is conveyed by the total of the distance D2 between the nip position L2 of the first conveyance rollers 114 and the second conveyance rollers 115, and the imaging position L0, and the distance D3.

Figure 9:
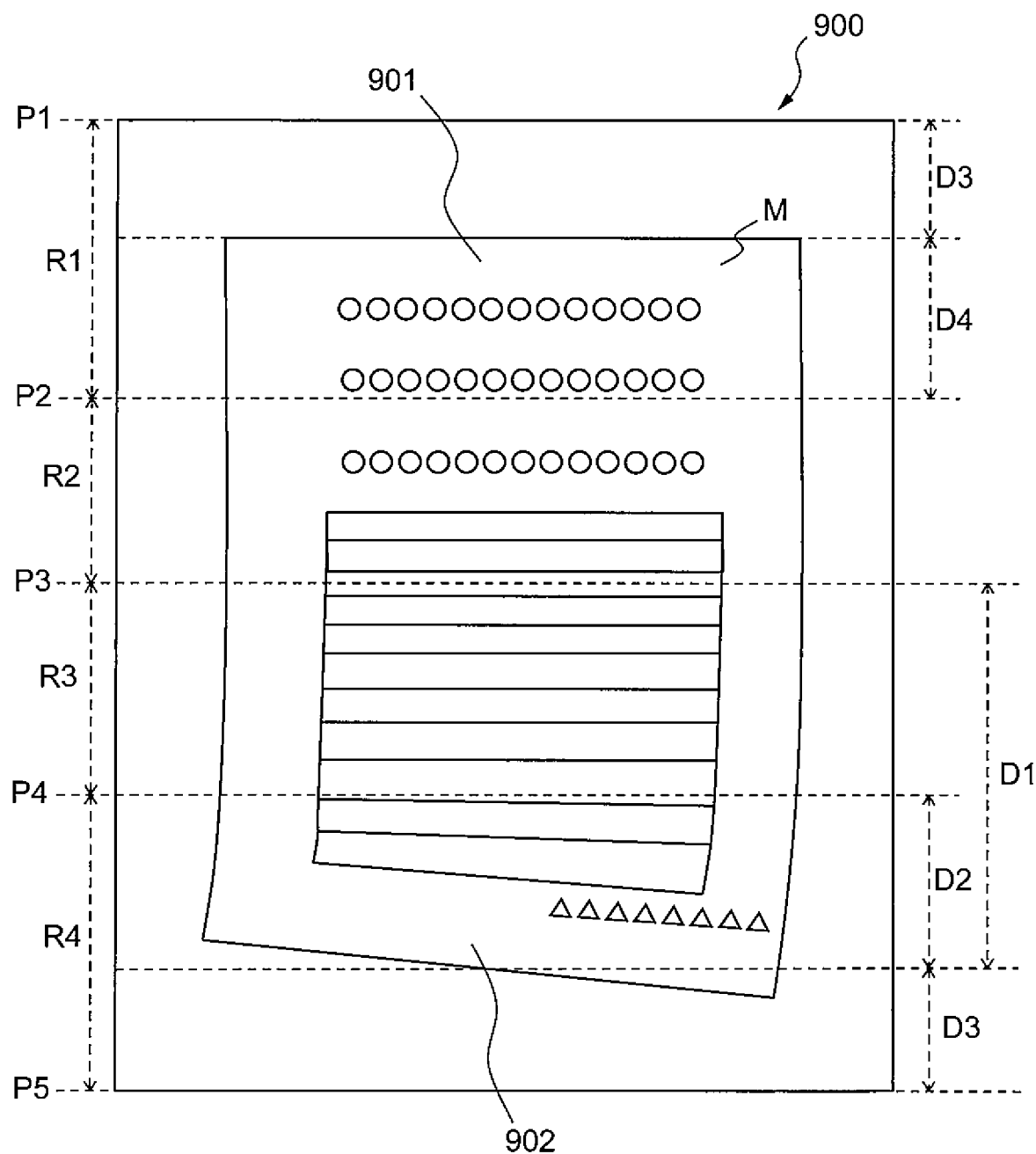
FIG. 9 is a schematic diagram illustrating an example of an input image 900.

FIG. 9 is a schematic diagram illustrating an example of an input image 900 in which the medium M is imaged by the imaging device 117.

When the front edge of the medium M reaches the arrangement position L3 of the second medium sensor 116 (FIG. 8A), imaging of the input image 900 is started, and a top position P1 is imaged. Subsequently, when the front edge of the medium M reaches the nip position L4 of the third conveyance rollers 118 and the fourth conveyance rollers 119 (FIG. 8B), a position P2 apart from the top position P1 by a length equivalent to the total of the distance D3 and the distance D4 is imaged. On the other hand, when the predetermined period elapses after the rear edge of the medium M passes the position of the second medium sensor 116 (FIG. 8E), the imaging of the input image 900 is ended, and a bottom position P5 is imaged. Accordingly, when the rear edge of the medium M reaches the nip position L1 of the feed rollers 112 and the brake rollers 113 (FIG. 8C), a position P3 apart from the bottom position P5 by a length equivalent to the total of the distance D1 and the distance D3 is imaged. Further, when the rear edge of the medium M reaches a position of the first conveyance rollers 114 and the second conveyance rollers 115 (FIG. 8D), a position P4 apart from the bottom position P5 by a length equivalent to the total of the distance D2 and the distance D3 is imaged.

In other words, a range R1 from the position P1 to the position P2 is imaged in a period in which the medium M is clamped by two groups of conveyance mechanisms, from a time when the front edge of the medium M reaches the arrangement position L3 of the second medium sensor 116 to a time when the front edge reaches the nip position L4 of the third conveyance rollers 118 and the fourth conveyance rollers 119. Further, a range R2 from the position P2 to the position P3 is imaged in a period in which the medium M is clamped by three groups of conveyance mechanisms, from a time when the front edge of the medium M reaches the nip position L4 to a time when the rear edge of the medium M reaches the nip position L1 of the feed rollers 112 and the brake rollers 113. Further, a range R3 from the position P3 to the position P4 is imaged in a period in which the medium M is clamped by two groups of conveyance mechanisms, from a time when the rear edge of the medium M reaches the nip position L1 to a time when the rear edge reaches the nip position L2 of the first conveyance rollers 114 and the second conveyance rollers 115. Further, a range R4 from the position P4 to the position P5 is imaged in a period in which the medium M is clamped by two groups of conveyance mechanisms, from a time when the rear edge of the medium M reaches the nip position L2 to a time when the predetermined period elapses after the rear edge passes the position of the second medium sensor 116.

In the image reading apparatus 100, a skew (oblique movement), that is, a medium being conveyed in a tilted manner, and particularly a so-called accumulated skew, that is, a conveyed medium gradually tilting due to a difference, etc., in conveyance force or frictional force at rollers lined up in a direction A8 perpendicular to the medium conveying direction, may occur. In the example illustrated in FIG. 9, the medium M is conveyed in such a way as to gradually tilt; and in the input image 900, a front edge part 901 of the medium M is imaged almost parallel with a vertical direction, that is, the medium conveying direction A1, whereas a rear edge part 902 is imaged in a tilted manner against the vertical direction. Such an accumulated skew particularly tends to occur on a card, a brochure, a passport, etc., having different thicknesses in the direction A8 perpendicular to the medium conveying direction.

The image reading apparatus 100 conveys a medium while clamping the medium with a plurality of conveyance mechanisms; and as a number of conveyance mechanisms clamping the medium during conveyance increases, a possibility of occurrence of an accumulated skew decreases, and as the number of conveyance mechanisms decreases, a possibility of occurrence of an accumulated skew increases. In other words, as a number of conveyance mechanisms clamping the medium when each pixel in an input image is photographed increases, reliability of the pixel being suitably imaged increases, and as the number of conveyance mechanisms decreases, reliability of the pixel being suitably imaged decreases.

Accordingly, the setting module 153 specifies, in an input image, each position where the number of conveyance mechanisms clamping the medium included in the input image changes, based on the relative positions stored in the position table, and divides the input image at each specified position. For example, the setting module 153 specifies the position P2 where clamping of the medium by the third conveyance rollers 118 and the fourth conveyance rollers 119 starts in the input image 900. Further, the setting module 153 specifies the position P3 where clamping of the medium by the feed rollers 112 and the brake rollers 113 ends in the input image 900. Further, the setting module 153 specifies the position P4 where clamping of the medium by the first conveyance rollers 114 and the second conveyance rollers 115 ends in the input image 900. The setting module 153 divides the input image 900 into the plurality of regions R1 to R4 at the respective specified positions.

Next, the setting module 153 sets a reliability level to each divided region in such a way that the reliability level increases as a number of conveyance mechanisms related to the divided region increases (step S109). For example, the setting module 153 sets a number of conveyance mechanisms related to each divided region as a reliability level. In that case, in the example illustrated in FIG. 9, a reliability level of the region R1 is set to 2, a reliability level of the region R2 is set to 3, a reliability level of the region R3 is set to 2, and a reliability level of the region R4 is set to 1. The setting module 153 may set a reliability level in such a way that the reliability level exponentially or logarithmically increases according to a number of conveyance mechanisms related to each region.

Next, the processing module 154 executes image processing on the input image (step S110). The processing module 154 executes the image processing based on at least a region in the input image a reliability level of which is greater than or equal to a first threshold value. Details of the image processing will be described later.

Next, the processing module 154 transmits a processed image acquired by executing the image processing on the input image to the information processing apparatus 200 through the first interface device 132 (step S111). The second CPU 220 in the information processing apparatus 200 receives the processed image from the image reading apparatus 100 through the second interface device 203, stores the received processed image into the second storage device 210, and also displays the received processed image on the second display device 202.

Next, the control module 151 determines whether or not a medium remains on the medium tray 103 based on a first detection signal acquired from the first medium sensor 111 (step S112). When a medium remains on the medium tray 103, the control module 151 returns the processing to step S104 and repeats the processing in steps S104 to S112.

On the other hand, when a medium does not remain on the medium tray 103, the control module 151 stops the driving device 131 (step S115) and ends the series of steps.

Each region in the input image and a reliability level of the region may be previously set according to a size of a conveyed medium. In that case, for each size of a medium, each region in an input image divided according to a number of conveyance mechanisms clamping the medium when each pixel in the input image is photographed and a reliability level of the region are previously set based on a relative position of each conveyance mechanism with respect to the imaging position L0 of the imaging devices 117. These pieces of information are previously stored in the first storage device 140, and the processing in steps S108 and S109 is omitted.

Figure 10:
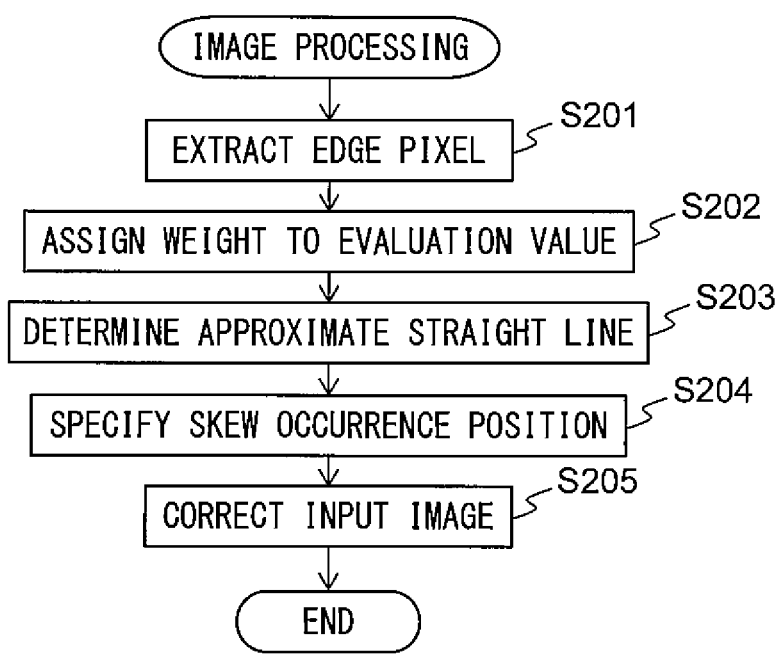
FIG. 10 is a flowchart illustrating an operation example of image processing.

FIG. 10 is a flowchart illustrating an operation example of image processing.

The operation flow illustrated in FIG. 10 is executed in step S110 in the flowchart illustrated in FIG. 7. In the example illustrated in FIG. 10, the processing module 154 executes tilt correction processing of a medium region included in an input image as image processing.

First, the processing module 154 extracts an edge pixel from the input image (step S201). For each line extending in a horizontal direction in the input image, the processing module 154 calculates an absolute value of a difference in a brightness value between both of pixels adjacent to each pixel in the horizontal direction (hereinafter referred to as an adjacent difference value) and extracts the leftmost pixel an adjacent difference value of which exceeds a predetermined threshold value, as a left edge pixel. Similarly, the processing module 154 extracts, in each horizontal line, the rightmost pixel an adjacent difference value of which exceeds the predetermined threshold value, as a right edge pixel. The predetermined threshold value may be set, for example, at a difference of gradient values in an image that can be visually distinguished by human eyes (for example, 20).

Note that the processing module 154 may calculate the absolute value of the difference between the luminance values of the pixels apart from each other at a predefined distance in each of the horizontal direction and the vertical direction in each of the input images as the adjacent difference value. Further, processing module 154 may use the color values (R values, G values, or B values) of the pixels instead of the luminance values in calculating the adjacent difference value. Further, the processing module 154 may extract edge pixels by comparing the luminance values or the color values of the input images with a predetermined threshold value. For example, the processing module 154 extracts a certain pixel as an edge pixel when the luminance value or the color value of the certain pixel is smaller than the predetermined threshold value and the luminance value or the color value of a pixel adjacent to the certain pixel or of a pixel apart from the certain pixel by a predefined distance is greater than the predetermined threshold value.

Figure 11:
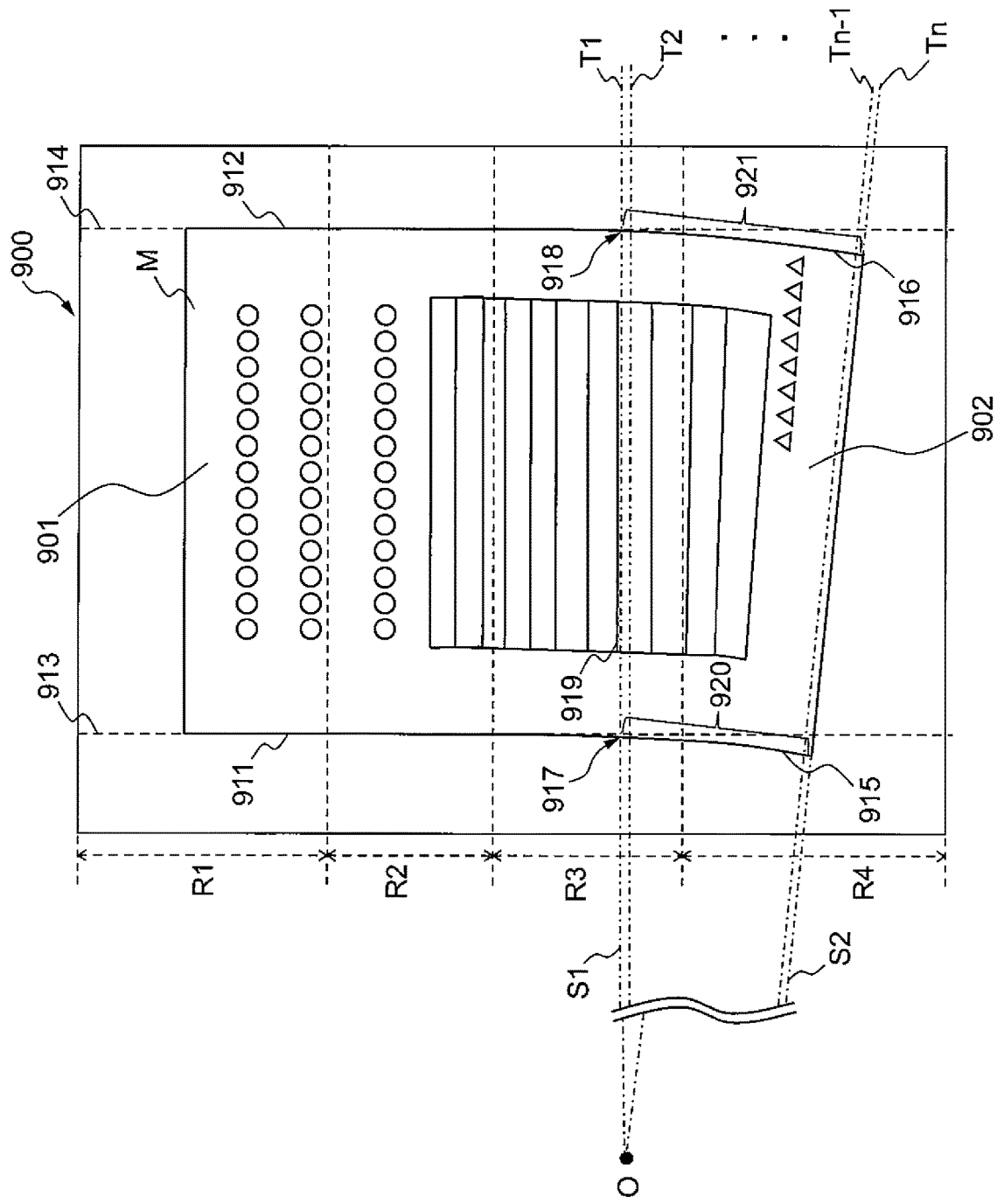
FIG. 11 is a schematic diagram for illustrating tilt correction processing.

FIG. 11 is a schematic diagram for illustrating the tilt correction processing. FIG. 11 illustrates an input image 900 in which a medium M conveyed in a tilted manner is imaged. In the example illustrated in FIG. 11, each pixel on the left edge 911 of the medium M is extracted as a left edge pixel, and each pixel on the right edge 912 on the medium M is extracted as a right edge pixel.

Next, the processing module 154 sets an evaluation value to each extracted edge pixel and assigns a weight to an evaluation value related to each region based on a reliability level of the region including the edge pixel (step S202). For example, the processing module 154 sets a subtraction value acquired by subtracting a brightness value of each edge pixel from a maximum value in a gradation range of a brightness value, as an evaluation value of the edge pixel. The processing module 154 may set an evaluation value by use of a color value of each pixel in place of a brightness value of each pixel. Each of these evaluation values takes a larger value as a pixel gets closer to black and takes a smaller value as the pixel gets closer to white. The processing module 154 may set a fixed value as an evaluation value of each edge pixel. An evaluation value is an example of a parameter. The processing module 154 assigns a weight to an evaluation value of each edge pixel included in each region in such a way that the evaluation value increases as a reliability level of the region including the edge pixel increases. For example, the processing module 154 assigns a weight to an evaluation value by multiplying an evaluation value of each edge pixel by a reliability level of a region including the edge pixel.

In the example illustrated in FIG. 11, each evaluation value is weighted in such a way that an evaluation value of each edge pixel included in the highest reliability level region R2 is greater than an evaluation value of each edge pixel included in the regions R1 and R3. Further, each evaluation value is weighted in such a way that an evaluation value of each edge pixel included in the lowest reliability level region R4 is less than an evaluation value of each edge pixel included in the regions R1 and R3.

Next, the processing module 154 determines an approximate straight line from the extracted edge pixels based on the weighted evaluation values (step S203). The processing module 154 determines an approximate straight line by use of the Hough transform. For each extracted left edge pixel, the processing module 154 extracts a plurality of straight line candidates passing the left edge pixel. The processing module 154 votes a weighted evaluation value set to each left edge pixel for a straight line candidate passing the left edge pixel. The processing module 154 determines a straight line candidate maximizing the total sum of voted evaluation values to be a left edge approximate straight line. Similarly, the processing module 154 determines a right edge approximate straight line from right edge pixels. An approximate straight line is an example of a reference position of a medium in an input image.

The processing module 154 may determine an approximate straight line by use of weighted least squares. In that case, for each of a plurality of straight line candidates, the processing module 154 calculates the total sum of multiplication values each of which is acquired by multiplying a distance between the straight line candidate and each left edge pixel by an evaluation value of the left edge pixel, and determines a straight line candidate minimizing the calculated total sum to be a left edge approximate straight line. Similarly, the processing module 154 determines a right edge approximate straight line from right edge pixels.

In the example illustrated in FIG. 11, a straight line 913 along each left edge pixel and a straight line 914 along each right edge pixel, the pixels being included in the high-reliability-level regions R1 to R3, are determined to be a left edge approximate straight line and a right edge approximate straight line, respectively. As illustrated in FIG. 11, the left edge approximate straight line 913 and the right edge approximate straight line 914 are determined in such a way as to extend in an almost vertical direction without being affected by the left edge 915 and the right edge 916 in the rear edge part 902 of the medium M conveyed in a tilted manner.

Next, based on the determined approximate straight lines, the processing module 154 specifies a skew occurrence position where an accumulated skew has first occurred (step S204). With respect to a predetermined number of consecutive left edge pixels or more, when a distance from the left edge approximate straight line is greater than or equal to a distance threshold value and also the distance gradually increases toward the bottom side, the processing module 154 determines that an accumulated skew is occurring. When determining that an accumulated skew is occurring, the processing module 154 specifies a position of a left edge pixel positioned uppermost out of the predetermined number of consecutive left edge pixels or more as a left edge skew occurrence position. Similarly, the processing module 154 specifies a right edge skew occurrence position from right edge pixels and the right edge approximate straight line.

The processing module 154 may specify a skew occurrence position based on a content, such as a straight line, within a medium included in an input image. In that case, for each line extending in the vertical direction in the input image, the processing module 154 calculates an adjacent difference value of each pixel in the vertical direction and extracts the uppermost pixel and the lowermost pixel an adjacent difference value of each exceeds a predetermined threshold value as a top edge pixel and a bottom edge pixel, respectively. The processing module 154 defines a region surrounded by left edge pixels, right edge pixels, top edge pixels, and bottom edge pixels as a medium region and extracts a pixel an adjacent difference value of which in the vertical direction in the medium region exceeds the predetermined threshold value as a content edge pixel. The processing module 154 detects a plurality of content straight lines extending in an almost horizontal direction from the extracted content edge pixel by use of of the Hough transform or least squares. With respect to a predetermined number of consecutive content straight lines or more, when an angle formed with a straight line perpendicular to the left edge approximate straight line is greater than or equal to an angle threshold value and also the angle gradually increases toward the bottom side, the processing module 154 determines that an accumulated skew is occurring. When determining that an accumulated skew is occurring, the processing module 154 specifies a position of a content straight line positioned uppermost out of the predetermined number of consecutive content straight lines or more as a left edge skew occurrence position. Similarly, the processing module 154 specifies a right edge skew occurrence position from content straight lines and the right edge approximate straight line.

In the example illustrated in FIG. 11, a position where left edge pixels start to separate from the left edge approximate straight line 913 or a position where a straight line 919 in the medium starts to tilt, viewed from the top side, is specified as a left edge skew occurrence position 917. Further, a position where right edge pixels start to separate from the right edge approximate straight line 914 or a position where the straight line 919 in the medium starts to tilt, viewed from the top side, is specified as a right edge skew occurrence position 918. In the example illustrated in FIG. 11, the left edge approximate straight line 913 and the right edge approximate straight line 914 are detected along untilted edges of the medium M, and therefore the left edge skew occurrence position 917 and the right edge skew occurrence position 918 are detected at correct positions.

Next, the processing module 154 executes the tilt correction processing of a medium region included in the input image based on the determined skew occurrence positions and generates a processed image acquired by correcting the input image (step S205), and ends the series of steps. The processing module 154 executes the tilt correction processing in such a way that a quadrangular region having the left edge skew occurrence position, the right edge skew occurrence position, the lowermost left edge pixel, and the lowermost right edge pixel as four corners is converted into a rectangular region.

For example, the processing module 154 executes the tilt correction processing by use of known geometric transformation. The processing module 154 detects a circular arc from left edge pixels positioned on the bottom side of the left edge skew occurrence position and also detects a circular arc from right edge pixels positioned on the bottom side of the right edge skew occurrence position. By use of the Hough transform or least squares, the processing module 154 detects circular arcs detected from the left edge pixels and the right edge pixels, respectively, in such a way that the circular arcs have the same center point, and radii of the circular arcs related to one another are positioned on the same straight line. Then, the processing module 154 extracts a plurality of straight lines each passing a pixel on one circular arc and the center point, and executes image rotation processing in such a way that each pixel on a line segment of each extracted straight line between the two circular arcs is arranged on a line segment perpendicular to the approximate straight line.

In the example illustrated in FIG. 11, circular arcs 920 and 921 respectively formed by the center point O and radii S1 and S2 are detected. Then, a plurality of straight lines T1 to Tn passing pixels on the circular arc 921 and the center point O are extracted, and the rotation processing is executed on each line segment of the extracted straight lines T1 to Tn between the two circular arcs 920 and 921. Assuming that each approximate straight line is detected in a tilted manner due to an effect of the left edge 915 and the right edge 916 in the rear edge part 902 of the medium M conveyed in a tilted manner, skew occurrence positions are improperly detected, and the tilt correction processing is improperly executed. In the example illustrated in FIG. 11, the left edge approximate straight line 913, the right edge approximate straight line 914, the left edge skew occurrence position 917, and the right edge skew occurrence position 918 are suitably detected, and therefore the tilt correction processing is suitably executed only on a tilted region in the medium region.

The processing module 154 may execute the tilt correction processing by performing known lens distortion correction processing performed for correcting a distortion of a camera lens.

Thus, the processing module 154 determines approximate straight lines based on an evaluation value weighted based on a reliability level of each region and executes the tilt correction processing on an entire input image based on the determined approximate straight lines. Consequently, the processing module 154 can reduce an effect of an edge of a medium in a tilted state included in a low-reliability-level region and can suppress erroneous correction of an untilted region in a medium region.

The processing module 154 may determine approximate straight lines only based on a region a reliability level of which in an input image is greater than or equal to a first threshold value, rather than determining approximate straight lines based on an evaluation value weighted based on a reliability level of each region. In that case, the processing module 154 omits the processing in step S202 and determines approximate straight lines only from edge pixels extracted from the region the reliability level of which is greater than or equal to the first threshold value, based on an unweighted evaluation value, in step S203. For example, the first threshold value is set to a value of a reliability level related to a region in which a number of conveyance mechanisms is greater than or equal to a predetermined number (for example, 2 or 3). Consequently, the processing module 154 can completely eliminate an effect of an edge of a medium in a tilted state included in a low-reliability-level region and can further suppress erroneous correction of an untilted region in a medium region.

Thus, the processing module 154 determines approximate straight lines based on at least a region a reliability level of which in an input image is greater than or equal to the first threshold value, and executes the tilt correction processing on the input image based on the determined approximate straight lines.

Further, the processing module 154 may execute the tilt correction processing only on a region a reliability level of which in an input image is less than a second threshold value, rather than executing the tilt correction processing on the entire input image. In that case, when a region a reliability level of which is greater than or equal to the second threshold value is included on the bottom side of a skew occurrence position, the processing module 154 does not execute the tilt correction processing on the region the reliability level of which is greater than or equal to the second threshold value. For example, the second threshold value is set to the same value as the first threshold value. The second threshold value may be set to a value different from the first threshold value. Consequently, the processing module 154 can suppress erroneous correction of a high-reliability-level region.

As described in detail above, the image reading apparatus 100 sets a reliability level to each region in an input image based on a number of conveyance mechanisms conveying a medium when each pixel in the input image is photographed, and executes the image processing on the input image based on a region reliability level of which is greater than or equal to the first threshold value. Consequently, the image reading apparatus 100 can satisfactorily execute the image processing based on a region imaged when the medium is stably conveyed and can more suitably execute the image processing on the input image.

Further, the image reading apparatus 100 previously stores information related to an arrangement position of conveyance mechanisms and sets a reliability level to each region in an input image based on the previously stored information related to the arrangement position of the arrangement mechanisms, and therefore can set a suitable reliability level for each model. Further, the image reading apparatus 100 can generate a satisfactory processed image without increasing a number of conveyance mechanisms and therefore can suppress increase in a device size and a device cost.

Figure 12:
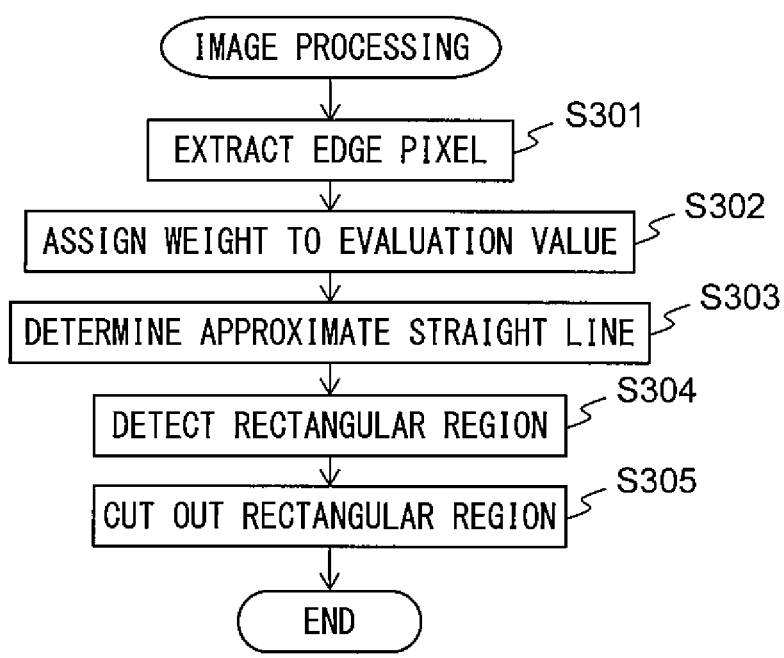
FIG. 12 is a flowchart illustrating an operation example of other image processing.

FIG. 12 is a flowchart illustrating an operation example of image processing according to another embodiment.

The operation flow illustrated in FIG. 12 is executed in place of the operation flow illustrated in FIG. 10. In the example illustrated in FIG. 12, the processing module 154 executes cropping (cutting out) processing of a medium region included in an input image as image processing.

First, the processing module 154 extracts an edge pixel from an input image, similarly to step S201 (step S301). However, the processing module 154 extracts a top edge pixel and a bottom edge pixel in addition to a left edge pixel and a right edge pixel. The processing module 154 extracts, in each vertical line, the uppermost pixel and the lowermost pixel an adjacent difference value of each exceeds a predetermined threshold value, as a top edge pixel and a bottom edge pixel, respectively.

Figure 13:
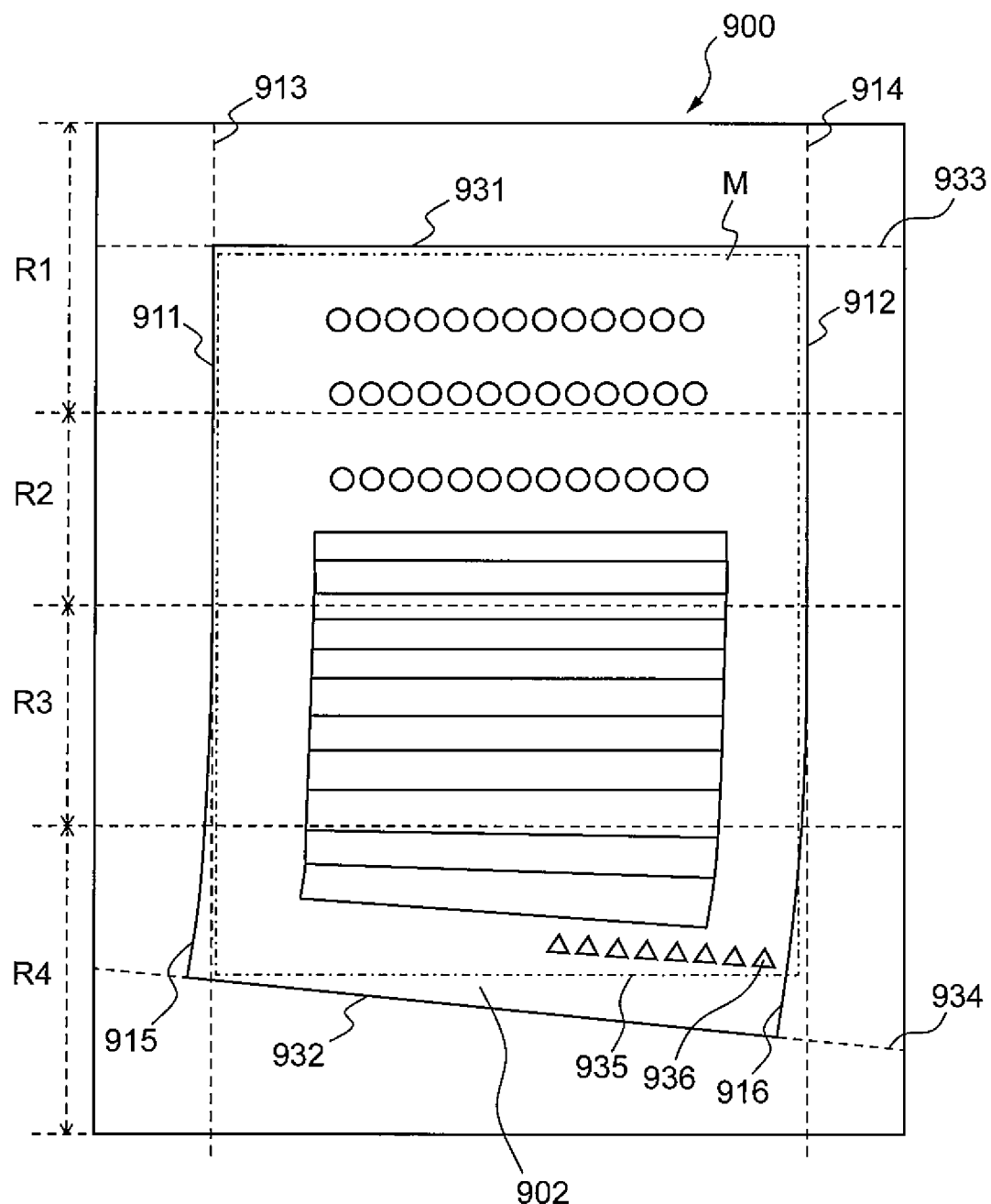
FIG. 13 is a schematic diagram for illustrating cropping processing.

FIG. 13 is a schematic diagram for illustrating the cropping processing. FIG. 13 illustrates an input image 900 in which a medium M conveyed in a tilted manner is imaged. In the example illustrated in FIG. 13, each pixel on the left edge 911 of the medium M is extracted as a left edge pixel, and each pixel on the right edge 912 is extracted as a right edge pixel. Further, each pixel on the top 931 is extracted as a top edge pixel, and each pixel on the bottom 932 is extracted as a bottom edge pixel.

Next, the processing module 154 sets an evaluation value to each extracted edge pixel, similarly to step S202, and assigns a weight to an evaluation value related to each region based on a reliability level of the region including the edge pixel (step S302).

Next, the processing module 154 determines approximate straight lines, similarly to step S203 (step S303). However, the processing module 154 determines a top approximate straight line from top edge pixels and determines a bottom approximate straight line from bottom edge pixels, in addition to a left edge approximate straight line and a right edge approximate straight line.

In the example illustrated in FIG. 13, a straight line 913 along the left edge pixels and a straight line 914 along the right edge pixels included in high-reliability-level regions R1 to R3 are determined to be a left edge approximate straight line and a right edge approximate straight line, respectively. Further, a straight line 933 along the top edge pixels and a straight line 934 along the bottom edge pixels are determined to be a top approximate straight line and a bottom approximate straight line, respectively.

Next, the processing module 154 detects a rectangular region based on the respective determined approximate straight lines (step S304). The processing module 154 detects an inscribed rectangular region of a region surrounded by the respective determined approximate straight lines as a rectangular region. When a cut out image may include an edge of a medium, the processing module 154 may detect a circumscribed rectangular region of the region surrounded by the respective determined approximate straight lines as a rectangular region.

In the example illustrated in FIG. 13, an inscribed rectangular region 935 of a region surrounded by the approximate straight lines 913, 914, 933, and 934 is detected. Assuming that each approximate straight line is detected in a tilted manner due to an effect of the left edge 915 and the right edge 916 in a rear edge part 902 of the medium M conveyed in a tilted manner, an inscribed rectangular region may be detected in a smaller size, and a character in a medium region may not be included in the inscribed rectangular region. In the example illustrated in FIG. 13, the left edge approximate straight line 913 and the right edge approximate straight line 914 are suitably detected, and therefore the inscribed rectangular region 935 is suitably detected in such a way as to include a character 936 positioned near the edge of the medium region.

Next, the processing module 154 generates a processed image in which the detected rectangular region is cut out (step S305) and ends the series of steps.

Thus, the processing module 154 determines approximate straight lines based on an evaluation value weighted based on of a reliability level of each region and executes the tilt correction processing on an entire input image based on the determined approximate straight lines. Consequently, the processing module 154 can reduce an effect of an edge of a medium in a tilted state included in a low-reliability-level region and can suppress improperly detecting approximate straight lines and cutting out a processed image in such a way as not to include a content in a medium region.

As described in detail above, the image reading apparatus 100 can more suitably execute the cropping processing on an input image.

Figure 14:
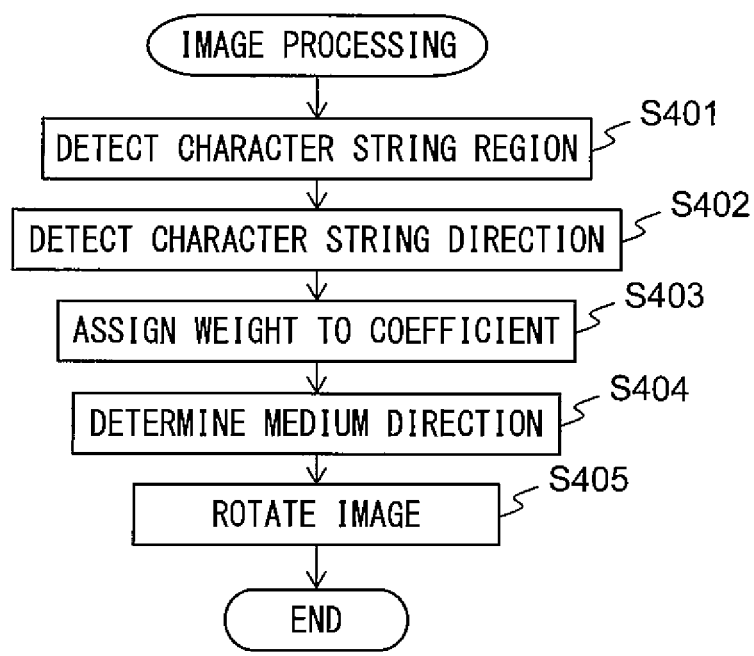
FIG. 14 is a flowchart illustrating an operation example of yet other image processing.

FIG. 14 is a flowchart illustrating an operation example of image processing according to yet another embodiment.

The operation flow illustrated in FIG. 14 is executed in place of the operation flow illustrated in FIG. 10. In the example illustrated in FIG. 14, the processing module 154 executes rotation processing of a content in a medium region included in an input image as image processing.

First, the processing module 154 detects a character string region from an input image (step S401). The processing module 154 first generates a binary image acquired by binarizing the input image. The processing module 154 generates, as a binary image, an image in which a pixel a gradient value of which in the input image is greater than or equal to a binarization threshold value is defined as a white pixel and a pixel a gradient value of which is less than the binarization threshold value is defined as a black pixel. The binarization threshold value is set by Otsu's binarization method, etc. Next, the processing module 154 puts together black pixels adjacent to one another in the binary image into a group by labeling and specifies a connected region in which black pixels are connected in the binary image. Next, out of circumscribed rectangular regions surrounding the specified connected region, the processing module 154 specifies a circumscribed rectangular region an area of which is less than or equal to a predetermined size as a character region. Next, the processing module 154 puts together character regions existing within a predetermined distance, size differences between the character regions being within a predetermined range, into a group and detects the group as a character string region.

Figure 15:
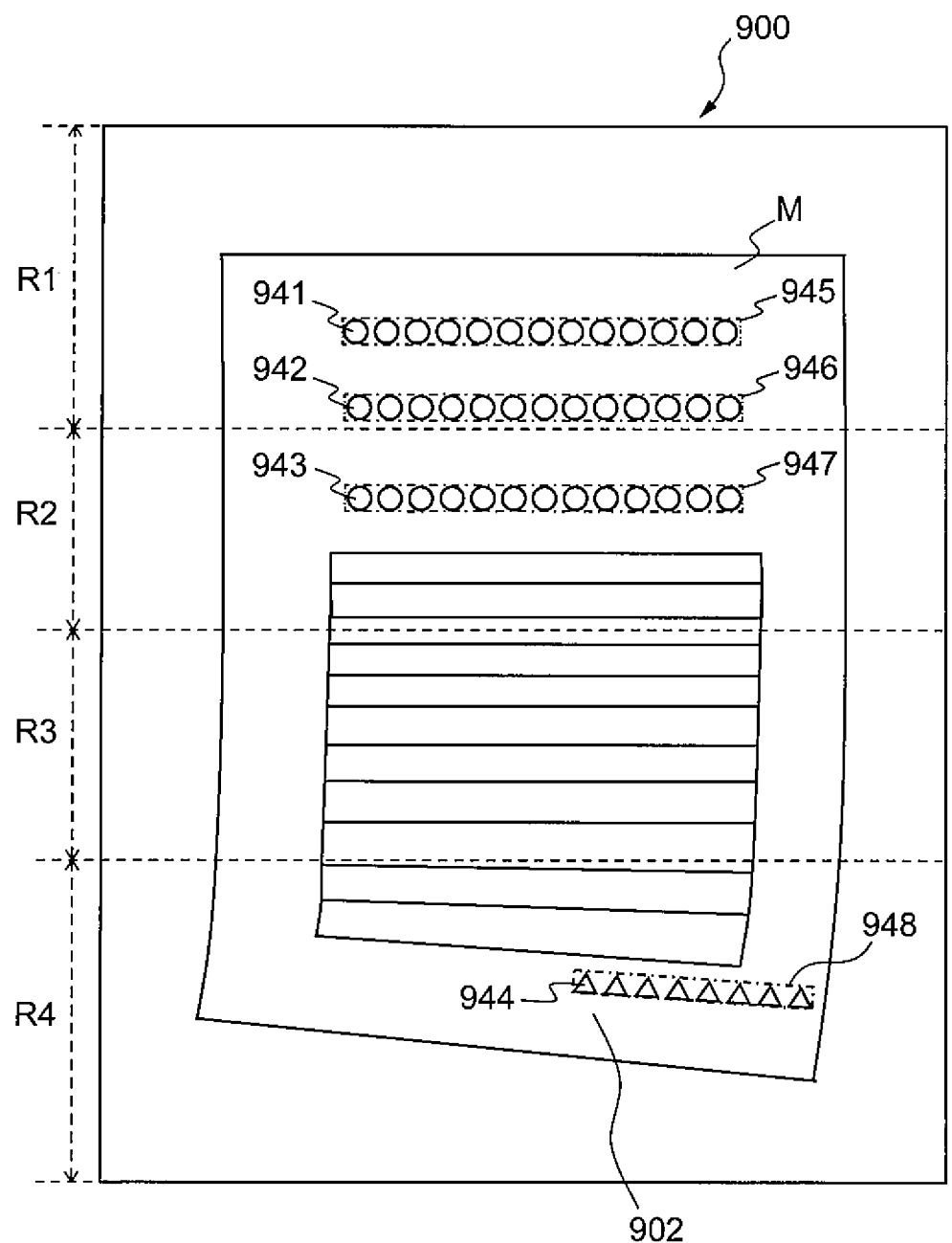
FIG. 15 is a schematic diagram for illustrating content rotation processing.

FIG. 15 is a schematic diagram for illustrating the content rotation processing. FIG. 15 illustrates an input image 900 in which a medium M conveyed in a tilted manner is imaged. In the example illustrated in FIG. 15, character string regions 945, 946, 947, and 948 respectively including characters 941, 942, 943, and 944 lined up in the horizontal direction in the medium M are detected.

Next, the processing module 154 detects a character string direction being a direction of each detected character string region (step S402). The processing module 154 measures a length of a circumscribed rectangle of each character string region in the vertical direction while rotating the character string region by a predetermined angle by use of known geometric transformation and detects an additive inverse (sign-inverted angle) of an angle minimizing the length as a character string direction of the character string region. The processing module 154 may detect a character from each character string region by use of a known OCR technology while rotating the character string region by a predetermined angle by use of known geometric transformation and detect an additive inverse of an angle maximizing a certainty factor of the detected character as a character string direction of the character string region.

In the example illustrated in FIG. 15, a character string direction of each of the character string regions 945, 946, and 947 is detected as 0°, and a character string direction of the character string region 948 is detected as −10°.

Next, the processing module 154 sets, to each detected character string region, a coefficient for calculating a weighted average of character string directions of the character string regions and assigns a weight to a coefficient related to each region based on a reliability level of the region including the character string region (step S403). A coefficient is an example of a parameter and is set in such a way that the total sum of the coefficients is 1. The processing module 154 assigns a weight to a coefficient of each character string region included in each region in such a way that the coefficient increases as a reliability level of the region including the character string region increases.

In the example illustrated in FIG. 15, each coefficient is weighted in such a way that a coefficient of the character string region 947 included in the highest reliability level region R2 is greater than each coefficient of the character string regions 945 and 946 included in the region R1. Further, each coefficient is weighted in such a way that a coefficient of the character string region 948 included in the lowest reliability level region R4 is less than each coefficient of the character string regions 945 and 946 included in the region R1.

Next, based on the weighted coefficients, the processing module 154 determines a medium direction being a reference direction of the medium in the input image, from the detected character string directions (step S404). The processing module 154 calculates the weighted average of character string directions of the character string regions by use of a weighted coefficient set to each character string region and determines the calculated weighted average to be the medium direction.

In the example illustrated in FIG. 15, a direction not being so much affected by the character string region 948 included in a low-reliability-level region R4 and being close to the character string direction (0°) of each of the character string regions 945 to 947 included in high-reliability-level regions R1 to R3 is determined to be the medium direction.

Next, the processing module 154 generates a processed image acquired by rotating each character string region according to the determined medium direction (step S405) and ends the series of steps. By use of known geometric transformation, the processing module 154 rotates each character string region in such a way that a character string direction of the character string region matches the medium direction.

Assuming that the medium direction is detected in a tilted manner due to an effect of the character string region 948 in the rear edge part 902 of the medium M conveyed in a tilted manner, each character string region is rotated in an improper direction. In the example illustrated in FIG. 15, the medium direction is suitably detected (almost at 0°), and therefore each character string region is not rotated in an improper direction.

Thus, the processing module 154 determines a medium direction based on a coefficient weighted based on a reliability level of each region and executes the content rotation processing on an entire input image based on the determined medium direction. Consequently, the processing module 154 can reduce an effect of a content in a tilted state included in a low-reliability-level region and can suppress rotation of a content in a medium region in an erroneous direction.

The processing module 154 may determine a medium direction only based on a region a reliability level of which in an input image is greater than or equal to the first threshold value, rather than determining a medium direction based on a coefficient weighted based on a reliability level each region. In that case, the processing module 154 omits the processing in step S403 and determines the average of character string directions of character string regions detected from the region the reliability level of which is greater than or equal to the first threshold value to be a medium direction in step S404. Consequently, the processing module 154 can completely eliminate an effect of a content in a tilted state included in a low-reliability-level region and further suppress rotation of a content in a medium region in an erroneous direction.

Thus, the processing module 154 determines a medium direction based on at least a region a reliability level of which in an input image is greater than or equal to the first threshold value, and executes the content rotation processing on the input image based on the determined medium direction.

Further, the processing module 154 may execute the content rotation processing only on a region a reliability level of which in an input image is less than the second threshold value, rather than executing the content rotation processing on the entire input image. In that case, the processing module 154 does not execute the content rotation processing on a character string region included in the region the reliability level of which is greater than or equal to the second threshold value. Consequently, the processing module 154 can suppress erroneous correction on a high-reliability-level region.

As described in detail above, the image reading apparatus 100 can more suitably execute the content rotation processing on an input image.

Figure 16:
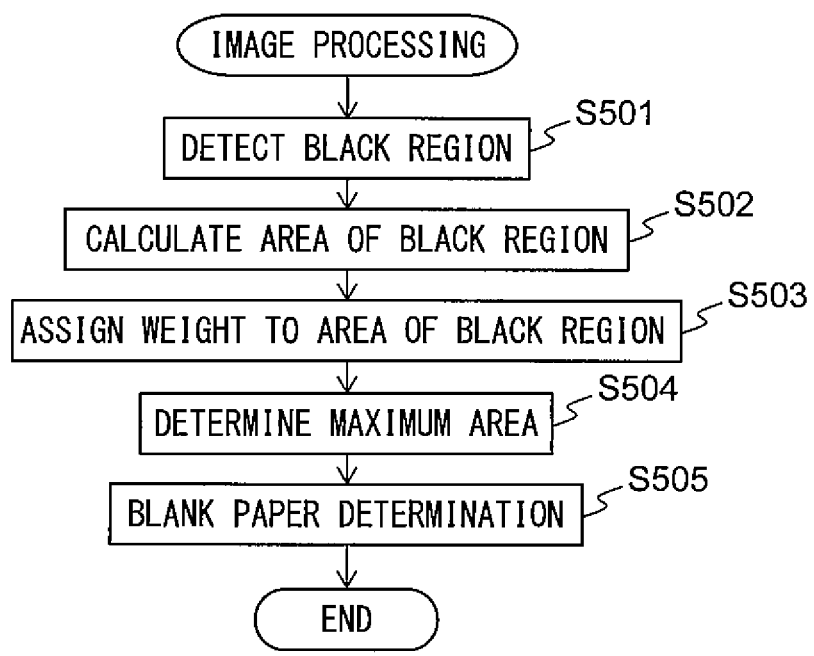
FIG. 16 is a flowchart illustrating an operation example of yet other image processing.

FIG. 16 is a flowchart illustrating an operation example of image processing according to yet another embodiment.

The operation flow illustrated in FIG. 16 is executed in place of the operation flow illustrated in FIG. 10. In the example illustrated in FIG. 16, the processing module 154 executes blank paper detection processing as image processing.

First, the processing module 154 detects a black region from an input image (step S501). Similarly to step S401, the processing module 154 generates a binary image from the input image and specifies a connected region in the binary image. Next, the processing module 154 specifies a circumscribed rectangular region surrounding the specified connected region as a black region.

Figure 17:
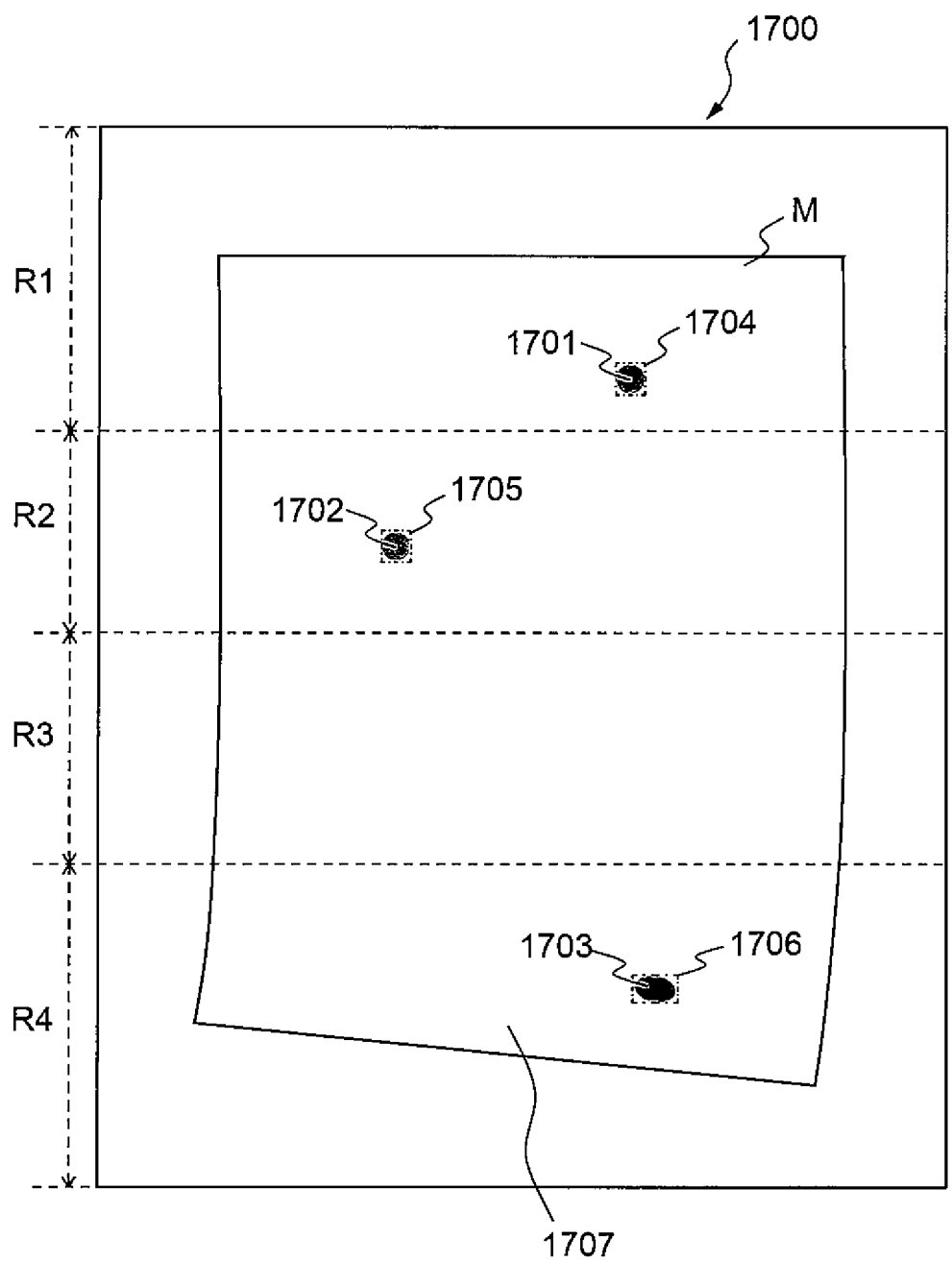
FIG. 17 is a schematic diagram for illustrating blank paper detection processing.

FIG. 17 is a schematic diagram for illustrating the blank paper detection processing. FIG. 17 illustrates an input image 1700 in which a blank medium M conveyed in a tilted manner is imaged. In the example illustrated in FIG. 17, black regions 1704, 1705, and 1706 respectively including noises 1701, 1702, and 1703 in the medium M are detected. In this example, the medium M is conveyed in a tilted manner, and therefore the noise 1703 in a rear edge part 1707 of the medium M is imaged in an enlarged manner from actual size.

Next, the processing module 154 calculates an area of each detected black region (step S502). The processing module 154 calculates a number of pixels included in each detected black region as an area of the black region.

Next, the processing module 154 assigns a weight to an area of each detected black region related to each region based on a reliability level of the region including the black region (step S503). An area of a black region is an example of a parameter. The processing module 154 assigns a weight to an area of each black region included in each region in such a way that the area decreases as a reliability level of the region including each character string region decreases.

In the example illustrated in FIG. 17, an area of the black region 1705 included in the highest reliability level region R2 remains as calculated, and an area of the black region 1704 included in a low-reliability-level region R1 is weighted in such a way as to be slightly smaller than a calculated area. Further, an area of the black region 1706 included in the lowest reliability level region R4 is weighted in such a way as to be much smaller than a calculated area.

Next, the processing module 154 determines a maximum black region area based on the weighted black region areas (step S504). The processing module 154 determines the maximum area out of the weighted black region areas to be a maximum black region area. The maximum black region area is an example of a reference area of a medium in an input image.

In the example illustrated in FIG. 17, the area of the black region 1705 included in the highest reliability level region R2 is less than the area of the black region 1706 included in the lowest reliability level region R4; however, as a result of weighting, the area of the black region 1705 is determined to be the maximum area.

Next, the processing module 154 determines whether or not the medium included in the input image is blank paper based on the determined maximum black region area and when the medium included in the input image is blank paper, deletes the input image (step S505) and ends the series of steps. The processing module 154 determines that the medium included in the input image is blank paper when the maximum area is less than an area threshold value and determines that the medium included in the input image is not blank paper when the maximum area is greater than or equal to the area threshold value.

Assuming that the blank paper determination is performed using the area of the black region 1706 of the enlarged noise 1703 in the rear edge part 1707 of the medium M conveyed in a tilted manner as-is, the blank medium M may be determined not to be blank paper by mistaking the noise 1703 for a character. In the example illustrated in FIG. 17, the medium M is suitably determined to be blank paper without being affected by the black region 1706.

Thus, the processing module 154 determines a maximum black region area based on a black region area weighted based on a reliability level of each region and executes the blank paper determination processing on the input image based on the determined maximum area. Consequently, the processing module 154 can reduce an effect of enlarged noise included in a low-reliability-level region and can suppress erroneously determining blank paper including noise not to be blank paper.

The processing module 154 may determine a maximum area only based on a region a reliability level of which in the input image is greater than or equal to the first threshold value, rather than determining a maximum area based on an area weighted based on a reliability level of each region. In that case, the processing module 154 omits the processing in step S503 and determines the maximum area out of black region areas detected from the region the reliability level of which is greater than or equal to the first threshold value to be a maximum black region area in step S504. Consequently, the processing module 154 can completely eliminate an effect of noise included in a low-reliability-level region and can suppress erroneous blank paper determination.

Thus, the processing module 154 determines a maximum black region area based on at least a region a reliability level of which in the input image is greater than or equal to the first threshold value, and executes the blank paper determination processing on the input image based on the determined maximum area.

As described in detail above, the image reading apparatus 100 can more suitably execute the blank paper determination processing on an input image.

Figure 18:
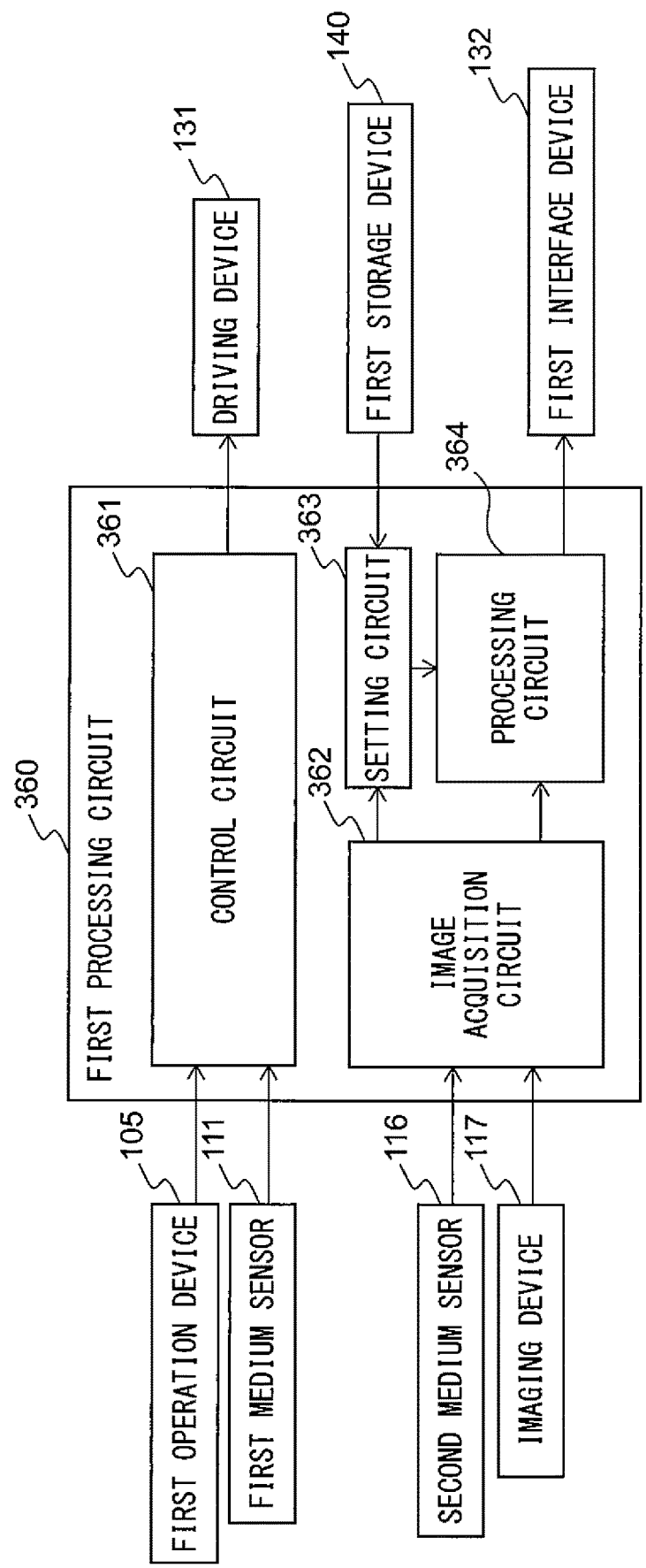
FIG. 18 is a diagram illustrating a schematic configuration of yet another first processing circuit 360.

FIG. 18 is a diagram illustrating a schematic configuration of a first processing circuit 360 in an image reading apparatus according to yet another embodiment.

The first processing circuit 360 is used in place of the first processing circuit 160 in the image reading apparatus 100 and executes the medium reading processing in place of the first CPU 140. The first processing circuit 360 includes a control circuit 361, an image acquisition circuit 362, a setting circuit 363, and a processing circuit 364. Each of these units may be independently configured with an integrated circuit, a microprocessor, firmware, etc.

The control circuit 361 is an example of a control module and has a function similar to the control module 151. The control circuit 361 receives an operation signal from a first operation device 105, a first detection signal from a first medium sensor 111, and drives a driving device 131 based on each received signal.

The image acquisition circuit 362 is an example of an image acquisition module and has a function similar to the image acquisition module 152. The image acquisition circuit 362 receives a second detection signal from a second medium sensor 116, and also receives an input image from an imaging device 117 and outputs the input image to the setting circuit 363 and the processing circuit 364.

The setting circuit 363 is an example of a setting module and has a function similar to the setting module 153. The setting circuit 363 receives an input image from the image acquisition circuit 362, and also receives a relative position of each conveyance mechanism from a first storage device 140, divides the input image into a plurality of regions based on the received information, sets a reliability level to each region, and outputs the setting result to the processing circuit 364.

The processing circuit 364 is an example of a processing module and has a function similar to the processing module 154. The processing circuit 364 receives an input image from the image acquisition circuit 362, receives a setting result of each region and each reliability level from the setting circuit 363, executes image processing based on the received information, and outputs a processed image to the information processing apparatus 200 through a first interface device 132.

As described in detail above, even when using the first processing circuit 360, the image reading apparatus can more suitably execute image processing on an input image.

Figure 19:
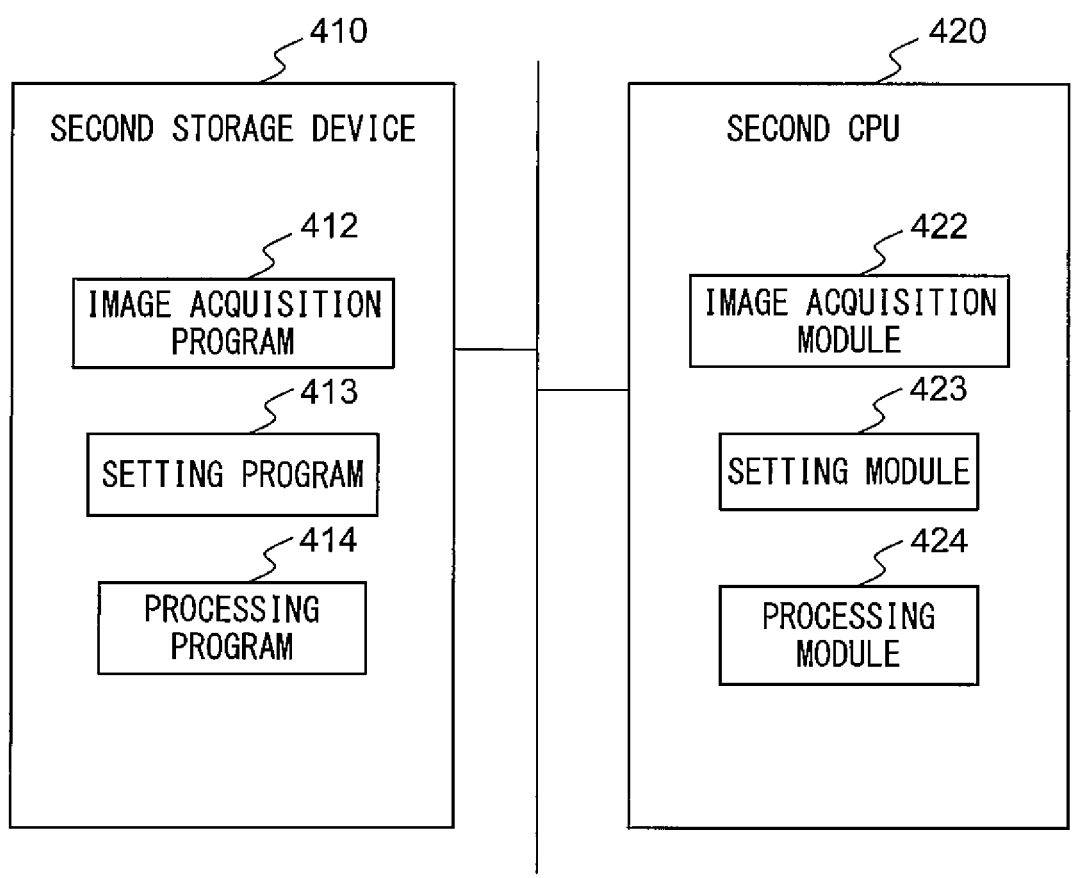
FIG. 19 is a diagram illustrating schematic configurations of a second storage device 410 and a second CPU 420.

FIG. 19 is a diagram illustrating schematic configurations of a second storage device 410 and a second CPU 420 in an information processing apparatus according to yet another embodiment.

The second storage device 410 and the second CPU 420 are used in place of the second storage device 210 and the second CPU 220 in the information processing apparatus 200. The information processing apparatus according to the present embodiment executes part of medium reading processing and image processing in place of the image reading apparatus 100.

As illustrated in FIG. 19, the second storage device 410 stores an image acquisition program 412, a setting program 413, a processing program 414, etc. Each of these programs is a functional module implemented by software operating on a processor. The second CPU 420 reads each program stored in the second storage device 410 and operates in accordance with each read program. Consequently, the second CPU 420 functions as an image acquisition module 422, a setting module 423, and a processing module 424. The image reading apparatus 100 according to the present embodiment does not include a setting module 153 and a processing module 154.

According to the present embodiment, the processing in steps S108 to S110 is omitted in the medium reading processing by the image reading apparatus 100 illustrated in FIG. 7. Further, in step S111, the first CPU 150 transmits the input image and the relative position of each part stored in the position table to the information processing apparatus through the first interface device 132. On the other hand, the image acquisition module 422 in the information processing apparatus receives the input image and the relative position of each part from the image reading apparatus 100 through the second interface device 203. The setting module 423 divides the input image into a plurality of regions and sets a reliability level to each region, similarly to steps S108 and S109. The processing module 424 executes image processing on the input image, similarly to step S110, and displays a processed image on a second display device 202.

As described in detail above, even when the information processing apparatus executes image processing, the image processing system can more suitably execute the image processing on an input image.

Figure 20:
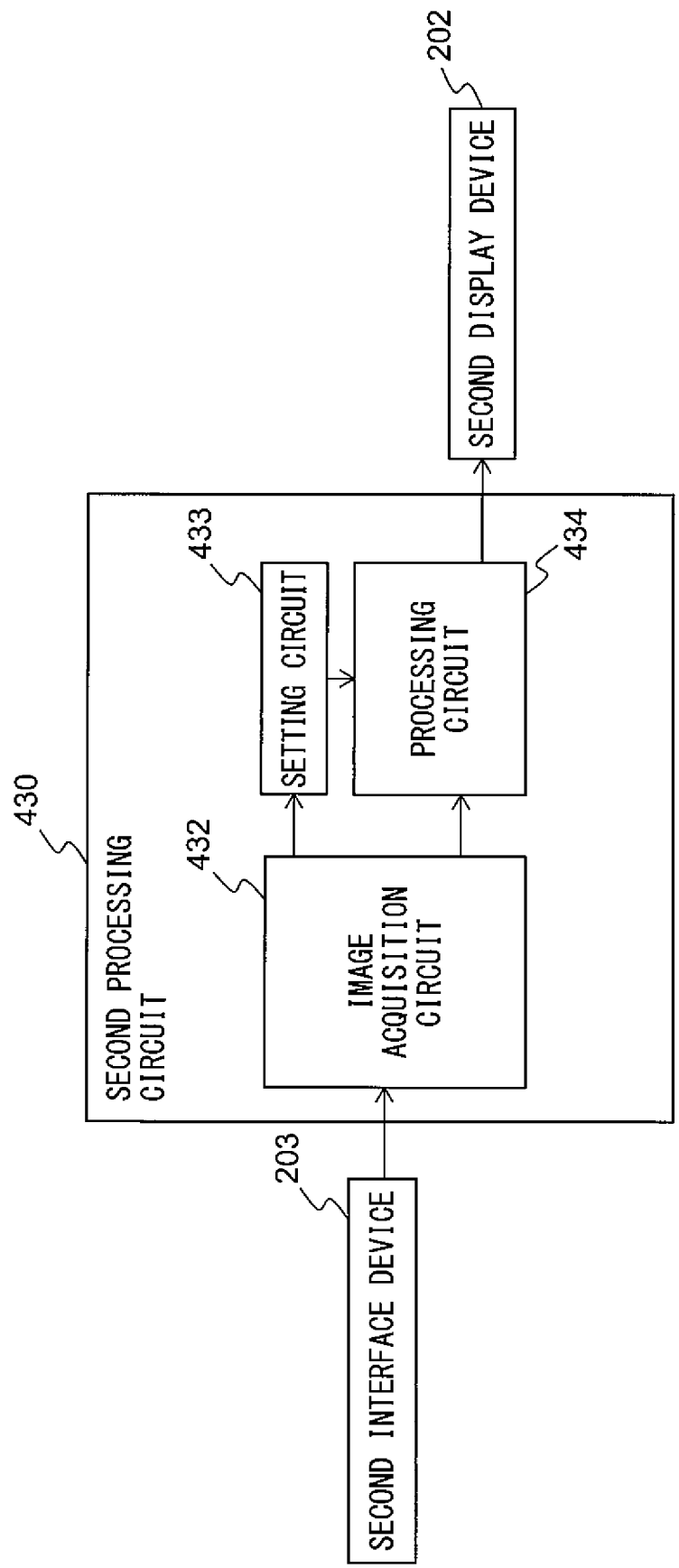
FIG. 20 is a diagram illustrating a schematic configuration of yet another second processing circuit 430.

FIG. 20 is a diagram illustrating a schematic configuration of a second processing circuit 430 according to yet another embodiment.

The second processing circuit 430 is used in place of the second processing circuit 230 in the information processing apparatus 200 and executes part of medium reading processing and image processing in place of the second CPU 230. The second processing circuit 430 includes an image acquisition circuit 432, a setting circuit 433, and a processing circuit 434.

The image acquisition circuit 432 is an example of an image acquisition module and has a function similar to the image acquisition module 422. The setting circuit 433 is an example of a setting module and has a function similar to the setting module 423. The processing circuit 434 is an example of a processing module and has a function similar to the processing module 424.

As described in detail above, even when the information processing apparatus executes image processing using the second processing circuit 430, the image processing system can more suitably execute the image processing on an input image.

Note that the modules of the image reading apparatus and the modules of the information processing apparatus can be disposed in various ways as appropriate in the image reading apparatus or the information processing apparatus. To provide an image processing service in the form of cloud computing, a plurality of information processing apparatuses may be dispersed on a network, where the information processing apparatuses may be caused to collaborate in performing processes allocated to the apparatuses.

While the preferred embodiments have been described above, embodiments are not limited to the above. For example, a number of the feed rollers 112, the brake rollers 113 and/or the first to fourth conveyance rollers 114, 115, 118, and 119 is not limited to two and may be one, or three or more. Further, each conveyance mechanism may be a combination of a roller and a pad, etc., rather than a roller pair. Further, imaging positions of the first imaging device 117a and the second imaging device 117b may be different from one another. In that case, the image reading apparatus 100 stores a position table for each imaging device 117 and changes divided regions and a reliability level set to each region for each input image acquired by the imaging device 117.

Further, the image reading apparatus 100 may set parts a number of conveyance mechanisms related to each is within a predetermined range (for example, parts a number of conveyance mechanisms related to which is greater than or equal to two and less than or equal to three) in an input image to the same region, rather than setting parts numbers of conveyance mechanisms related to which are different to different regions.

Further, the image reading apparatus 100 and/or the information processing apparatus 200 may execute two or more types of the aforementioned image processing in combination, rather than executing only one type of image processing. In that case, the first threshold value and/or the second threshold value may be changed for each type of image processing.

According to this embodiment, the image reading apparatus, the image processing system, the control method, and the computer-readable, non-transitory medium storing the control program, can more suitably execute image processing on an input image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
a plurality of conveyance mechanisms for clamping and conveying a medium;
an imaging device for generating an input image of a medium;
a storage device for storing relative positions of each of the plurality of conveyance mechanisms with respect to an imaging position of the imaging device; and
a processor to:
divide the input image into a plurality of regions in such a way that each number of conveyance mechanisms clamping a medium when pixels in each of the plurality of divided regions in the input image are photographed is the same, based on the relative positions,
set a reliability level to each of the plurality of regions in such a way that the reliability level increases as the number of conveyance mechanisms clamping the imaged medium when each of the plurality of divided regions photographed increases, and
generate a processed image by processing the input image based on at least a region the reliability level of which is greater than or equal to a threshold value, out of the plurality of regions in the input image, and output the processed image.

2. The image reading apparatus according to claim 1, wherein the processor further determines a reference position, a reference direction, or a reference area, of a medium in the input image based on at least a region the reliability level of which is greater than or equal to the threshold value, from of the plurality of regions in the input image, and processes the input image based on the reference position, the reference direction, or the reference area.

3. The image reading apparatus according to claim 2, wherein the processor determines the reference position, the reference direction, or the reference area, only based on a region in the input image, the reliability level of which is greater than or equal to the threshold value.

4. The image reading apparatus according to claim 2, wherein the processor further assigns a weight to a parameter related to each of the plurality of regions based on the reliability levels of each of the plurality of regions and determines the reference position, the reference direction, or the reference area, based on the parameter with the assigned weight.

5. The image reading apparatus according to claim 1, wherein the processor processes the input image for a region in the input image the reliability level of which is less than the threshold value.

6. The image reading apparatus according to claim 1, wherein the processor processes the input image for the entire input image.

7. The image reading apparatus according to claim 1, wherein the processor executes a tilt correction of a medium region included in the input image, a cropping of the medium region, a rotation of a content in the medium region, or blank paper detection.

8. An image reading apparatus comprising:
a plurality of conveyance mechanisms for clamping and conveying a medium;
an imaging device for generating an input image of a medium;
a storage device for storing relative positions of each of the plurality of conveyance mechanisms with respect to an imaging position of the imaging device; and
a processor to
process the input image based on at least a region in the input image, a reliability level of which is greater than or equal to a threshold value; generate a processed image, wherein the plurality of regions are divided, in such a way that each number of conveyance mechanisms clamping a medium when pixels in each of the plurality of divided regions in the input image are photographed is the same, based on the relative positions, and wherein the reliability level increases as the number of conveyance mechanisms clamping the imaged medium when each of the plurality of divided regions is photographed increases; and
output the processed image.

9. An image processing system comprising:
an image reading apparatus and an information processing apparatus, wherein the image reading apparatus includes:

a plurality of conveyance mechanisms for clamping and conveying a medium; and an imaging device for generating an input image of a medium, a storage device for storing relative positions of each of the plurality of conveyance mechanisms with respect to an imaging position of the imaging device, and wherein the information processing apparatus includes a processor to:

process the input image based on at least a region in the input image, a reliability level of which is greater than or equal to a threshold value; generate a processed image, wherein the plurality of regions are divided, in such a way that each number of conveyance mechanisms clamping a medium when pixels in each of the plurality of divided regions in the input image are photographed is the same, based on the relative positions, and wherein the reliability level increases as the number of conveyance mechanisms clamping the imaged medium when each of the plurality of divided regions is photographed increases; and output the processed image.

10. A control method for an image reading apparatus including a plurality of conveyance mechanisms for clamping and conveying a medium, an imaging device for generating an input image of a medium, and a storage device for storing relative positions of the plurality of conveyance mechanisms with respect to an imaging position of the imaging device, the method comprising:

processing the input image based on at least a region in the input image, a reliability level of which is greater than or equal to a threshold value;

generating a processed image, wherein the plurality of regions are divided, in such a way that each number of conveyance mechanisms clamping a medium when pixels in each of the plurality of divided regions in the input image are photographed is the same, based on the relative positions, and wherein the reliability level increases as the number of conveyance mechanisms clamping the imaged medium when each of the plurality of divided regions is photographed increases; and outputting the processed image.

* * * * *